(12) United States Patent
Zhang

(10) Patent No.: US 11,473,262 B2
(45) Date of Patent: Oct. 18, 2022

(54) BAILEY SUPPORT SYSTEM APPLIED TO CROSS PROTECTION OF COMPLEX PIPES AND CABLES AND CONSTRUCTION METHOD THEREOF

(71) Applicant: CHINA RAILWAY 18 BUREAU GROUP CO., LTD., Tianjin (CN)

(72) Inventor: Xin Zhang, Tianjin (CN)

(73) Assignee: CHINA RAILWAY 18 BUREAU GROUP CO., LTD., Tianjin (CN)

( * ) Notice: Subject to any disclaimer, the term of this patent is extended or adjusted under 35 U.S.C. 154(b) by 313 days.

(21) Appl. No.: 16/625,143

(22) PCT Filed: Feb. 28, 2019

(86) PCT No.: PCT/CN2019/076471
§ 371 (c)(1),
(2) Date: Dec. 20, 2019

(87) PCT Pub. No.: WO2020/103351
PCT Pub. Date: May 28, 2020

(65) Prior Publication Data
US 2021/0010222 A1    Jan. 14, 2021

(30) Foreign Application Priority Data
Nov. 21, 2018 (CN) .......................... 201811389323.9

(51) Int. Cl.
*F16L 3/22* (2006.01)
*E02D 29/045* (2006.01)
*E02D 29/00* (2006.01)

(52) U.S. Cl.
CPC ........... *E02D 29/045* (2013.01); *E02D 29/04* (2013.01); *F16L 3/22* (2013.01)

(58) Field of Classification Search
CPC ...................................... F16L 3/00; F16L 3/22
See application file for complete search history.

(56) References Cited

FOREIGN PATENT DOCUMENTS

| CN | 102787560 A | 11/2012 |
|---|---|---|
| CN | 203144907 U | 8/2013 |
| CN | 104676110 A | 6/2015 |
| CN | 105570539 A * | 5/2016 |
| CN | 205529923 U | 8/2016 |

\* cited by examiner

*Primary Examiner* — Sunil Singh
(74) *Attorney, Agent, or Firm* — Troutman Pepper Hamilton Sanders LLP; Christopher C. Close, Jr.

(57) ABSTRACT

Disclosed is a Bailey support system applied to cross protection of complex pipes and cables in an intersection tunnel, including a type I suspension system, a type II suspension system, type III suspension systems, a type IV suspension system, and a type V suspension system, where two groups of the type III suspension systems are disposed on a front side of the type IV suspension system, and two groups of the type III suspension systems are disposed on a rear side of the type IV suspension system and are in one-to-one correspondence with the other two groups disposed on the front side, the type II suspension system and the type I suspension system are sequentially disposed on a left side of the type IV suspension system from left to right, and the type V suspension system is disposed on a right side of the type IV suspension system.

14 Claims, 9 Drawing Sheets

BAILEY SUPPORT SYSTEM APPLIED TO CROSS PROTECTION OF COMPLEX PIPES AND CABLES AND CONSTRUCTION METHOD THEREOF

TECHNICAL FIELD

The present invention relates to the technical field of underground pipeline construction, and in particular to a Bailey support system applied to cross protection of complex pipes and cables in an intersection tunnel in an intersection tunnel and a construction method thereof.

BACKGROUND

An underground passageway is built at a road intersection of a region, with an area of 4000 square meters. The underground passageway is constructed by using an open cut method. The intersection is a main trunk road of this region. An underground pipe network is complex and heating pipelines (constructed at a heating period), a 66 KV high voltage line, a plurality of 10 KV high voltage lines, a high-voltage control box and a plurality of communication lines and the like cannot be relocated.

The heating pipelines (constructed at a heating period), the 66 KV high voltage line, the 10 KV high voltage lines and a subway 10 KV special railway line are in three-dimensional intersection, and the height difference is up to 2 meters. A Bailey support cannot achieve crisscross spanning. To achieve the crisscross spanning, a drilled pile needs to be heightened by nearly 2 m. Since a foundation pit excavation depth is 10 m, an exposed length is large after the drilled pile is excavated, and the weight of the Bailey support and pipelines is concentrated on the drilled pile; at the same time, the project is close to the sea, the monsoon is larger, the safety risk is greater, and thus a crisscross spanning solution is not adopted.

SUMMARY

An objective of the present invention is to provide a Bailey support system applied to cross protection of complex pipes and cables in an intersection tunnel in an intersection tunnel and a construction method thereof, to solve the problems existing in the prior art mentioned above, and make the underground pipeline construction operation convenient, reduce cost and avoid safety risks.

To achieve the above purpose, the present invention provides the following technical solutions.

The present invention provides a Bailey support system applied to cross protection of complex pipes and cables in an intersection tunnel, including a type I suspension system, a type II suspension system, type III suspension systems, a type IV suspension system, and a type V suspension system, where the type III suspension systems are divided into four groups, two groups of the type III suspension systems are disposed on a front side of the type IV suspension system, and the other two groups of the type III suspension systems are disposed on a rear side of the type IV suspension system and are in one-to-one correspondence with the two groups of the type III suspension systems disposed on the front side, the type II suspension system and the type I suspension system are sequentially disposed on a left side of the type IV suspension system from left to right, and the type V suspension system is disposed on a right side of the type IV suspension system; the type II suspension system, the type IV suspension system and the type V suspension system are parallel to each other; and the type I suspension system and the type III suspension system are parallel to each other and are perpendicular to the type II suspension system.

Preferably, the type I suspension system includes a first I-shaped steel assembly, a first Bailey support assembly, a first suspension device and a first drilled pile, where two ends of the first Bailey support assembly are respectively in lap joint with the first I-shaped steel assembly, two ends of the first I-shaped steel assembly are respectively in lap joint with the first drilled pile, an upper end of the first suspension device is in lap joint with an upper side of the first Bailey support assembly, and a lower end of the first suspension device is configured to support a first pipeline; the type III suspension system includes third I-shaped steel assemblies, a third Bailey support assembly, third suspension devices, third drilled piles and a fourth drilled pile, where two ends of the third Bailey support assembly are respectively in lap joint with the third I-shaped steel assembly, two ends of the third I-shaped steel assembly are respectively in lap joint with the third drilled pile, and a middle portion of the third I-shaped steel assembly is in lap joint with the fourth drilled pile; an upper end of the third suspension device is in lap joint with an upper side of the third Bailey support assembly, and lower ends of two groups of third suspension devices corresponding in a front-rear mode are configured to support a second pipeline, and lower ends of the other two groups of third suspension device are configured to support a third pipeline.

Preferably, the type II suspension system includes a second I-shaped steel assembly, a second Bailey support assembly, a second suspension device and a second drilled pile, where two ends of the second Bailey support assembly are respectively in lap joint with the second I-shaped steel assembly, two ends of the second I-shaped steel assembly are respectively in lap joint with the second drilled pile, an upper end of the second suspension device is in lap joint with an upper side of the second Bailey support assembly, and a lower end of the second suspension device is configured to support a heating pipeline; the type V suspension system includes fourth I-shaped steel assemblies, a fifth Bailey support assembly, a fifth suspension device and a fifth drilled pile, where two ends of the fifth Bailey support assembly are respectively in lap joint with the fourth I-shaped steel assembly, two ends of one of the fourth I-shaped steel assemblies are respectively in lap joint with the third drilled pile, two ends of another fourth I-shaped steel assembly are respectively in lap joint with the fifth drilled pile, an upper end of the fifth suspension device is in lap joint with an upper side of the fifth Bailey support assembly, and a lower end of the fifth suspension device is configured to support the heating pipeline.

Preferably, the type IV suspension system includes supporting Bailey support assemblies, a fourth Bailey support assembly and a fourth suspension device, where two ends of the fourth Bailey support assembly are respectively in lap joint with the supporting Bailey support assembly, two ends of the supporting Bailey support assembly are respectively in lap joint with the third drilled pile, the fourth Bailey support assembly is perpendicular to the supporting Bailey support assembly, an upper end of the fourth suspension device is in lap joint with an upper side of the fourth Bailey support assembly, and a lower end of the fourth suspension device is configured to support the heating pipeline.

Preferably, the number of the second Bailey support assemblies, the fourth Bailey support assemblies and the fifth Bailey support assemblies matches the heating pipelines.

Preferably, the first suspension device, the second suspension device, the third suspension device, the fourth suspension device and the fifth suspension device are each a frame made of groove steel.

Preferably, the first I-shaped steel assembly, the second I-shaped steel assembly, the third I-shaped steel assembly and the fourth I-shaped steel assembly are each formed by welding two bars of 45a I-shaped steel side by side.

Preferably, the first drilled pile, the second drilled pile, the third drilled pile, the fourth drilled pile and the fifth drilled pile have a same structure, the first drilled pile includes a reinforcement cage and an embedded steel plate disposed in the reinforcement cage, and concrete is adopted for filling between the reinforcement cage and the embedded steel plate.

The present invention further provides a method for construction of the above-described Bailey support system applied to cross protection of complex pipes and cables in an intersection tunnel, including the following steps:

step S1: according to a distribution diagram of an underground pipe network, detecting all the underground pipe network;

step S2: determining positions of first drilled piles, a second drilled pile, a third drilled pile, a fourth drilled pile and a fifth drilled pile according to the position of the underground pipe network obtained by detection, a drilling rig entering a site to carry out the construction of the drilled piles, installing embedded steel plate in the middle position of a reinforcement cage, and after the installation is in place, pouring concrete between the reinforcement cage and the embedded steel plate;

step S3: when concrete reaches a strength, removing a pile head of the drilled pile, removing concrete around the embedded steel plate, and cutting a pile top of the drilled pile into a plane;

step S4: respectively measuring distances between two first drilled piles, the second drilled pile, the third drilled pile and the fifth drilled pile and recording data, cutting a first I-shaped steel assembly, a second I-shaped steel assembly, a third I-shaped steel assembly and a fourth I-shaped steel assembly according to the recorded data, causing the lengths of the first I-shaped steel assembly, the second I-shaped steel assembly, the third I-shaped steel assembly and the fourth I-shaped steel assembly to be according to the recorded data+1000 mm to ensure tension lengths of the first I-shaped steel assembly, the second I-shaped steel assembly, the third I-shaped steel assembly and the fourth I-shaped steel assembly on the first drilled pile, the second drilled pile, the third drilled pile, and the fifth drilled pile respectively;

step S5: drawing a center line on the embedded steel plate, symmetrically arranging and welding the first I-shaped steel assembly, the second I-shaped steel assembly, the third I-shaped steel assembly and the fourth I-shaped steel assembly respectively along the center line of the corresponding embedded steel plate, and at the same time respectively welding two bars of 45a I-shaped steel of the first I-shaped steel assembly, the second I-shaped steel assembly, the third I-shaped steel assembly and the fourth I-shaped steel assembly into a whole;

step S6: placing two groups of supporting Bailey support assemblies on two fourth drilled piles respectively, and welding two ends of the supporting Bailey support assembly to the corresponding embedded steel plate;

step S7: installing and welding a second Bailey support assembly on the second I-shaped steel assembly, installing and welding a first Bailey support assembly on the first I-shaped steel assembly, installing and welding fourth Bailey support assemblies on the two groups of supporting Bailey support assemblies, installing and welding a fifth Bailey support assembly on the fourth I-shaped steel assembly, installing and welding two groups of third Bailey support assemblies on two groups of third I-shaped steel assemblies respectively, welding inclined struts on two sides of the first Bailey support assembly, the second Bailey support assembly, the third Bailey support assembly, the fourth Bailey support assembly, the fifth Bailey support assembly and a supporting Bailey support, to ensure the stability of the first Bailey support assembly, the second Bailey support assembly, the third Bailey support assembly, the fourth Bailey support assembly, the fifth Bailey support assembly and the supporting Bailey support;

step S8: installing a first suspension device, a second suspension device, a third suspension device, a fourth suspension device and a fifth suspension device on the first Bailey support assembly, the second Bailey support assembly, the third Bailey support assembly, the fourth Bailey support assembly and the fifth Bailey support assembly respectively; and step S9: after the construction of a main body of an underground passage is completed, adopting a support underpinning method to underpin an underground pipeline and a heating pipeline at an underground passage top plate; after the underpinning is completed, first removing the first suspension device, the second suspension device, the third suspension device, the fourth suspension device and the fifth suspension device and then using a tower crane to dismantle the first Bailey support assembly, the second Bailey support assembly, the third Bailey support assembly, the fourth Bailey support assembly and the fifth Bailey support assembly, then removing the first I-shaped steel assembly, the second I-shaped steel assembly, the third I-shaped steel assembly, the fourth I-shaped steel assembly and the supporting Bailey support, and finally removing the first drilled pile, the second drilled pile, the third drilled pile, the fourth drilled pile and the fifth drilled pile.

Compared with the prior art, the present invention achieves the following technical effects:

1. The heightening of a support pile can be avoided to avoid safety risks. At the same time, a Bailey support assembly overlaying system is safe and reliable, simple in structure and convenient to construct.

2. A Bailey support assembly can be rented, and an I-shaped steel assembly and a suspension device used by a hanging bracket system can be recycled. The present invention is simple and practical, saves cost and has good economy.

3. The construction is convenient, and a large device and a large number of professionals are not needed.

BRIEF DESCRIPTION OF THE DRAWINGS

To describe the technical solutions in the embodiments of the present invention or in the prior art more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

1. type I suspension system, 2. type II suspension system, 3. type III suspension system, 4. type IV suspension system, 5. type V suspension system, 6. first drilled pile, 7. first I-shaped steel assembly, 8. first pipeline, 9. second drilled pile, 10. second I-shaped steel assembly, 11. heating pipeline, 12. third drilled pile, 13. fourth drilled pile, 14. third I-shaped steel assembly, 15. second pipeline, 16. third pipeline, 17. supporting Bailey support assembly, 18. embedded steel plate, 19. fourth I-shaped steel assembly, 20. first Bailey support assembly, 21. first suspension device, 22. second Bailey support assembly, 23. second suspension device, 24. third Bailey support assembly, 25. third suspension device, 26. fourth Bailey support assembly, 27. fourth suspension device, 28. fifth Bailey support assembly, 29. fifth suspension device, 30. fifth drilled pile.

DETAILED DESCRIPTION

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood in the description of the present invention that the orientational or positional relationship indicated by the terms "upper", "lower", "left" and "right" is based on the orientational and positional relationship shown in the accompanying drawings, and is merely for convenience of description of the structure and operation modes rather than indicating or implying that the part referred to must have a specific orientation and operate in the specific orientation, which thus cannot be construed as limiting the present invention.

An objective of the present invention is to provide a Bailey support system applied to cross protection of complex pipes and cables in an intersection tunnel in an intersection tunnel and a construction method thereof, to solve the problems existing in the prior art, and make the underground pipeline construction operation convenient, reduce cost and avoid safety risks.

To make the foregoing objective, features, and advantages of the present invention clearer and more comprehensible, the present invention is further described in detail below with reference to the accompanying drawings and specific embodiments.

Figure 1:
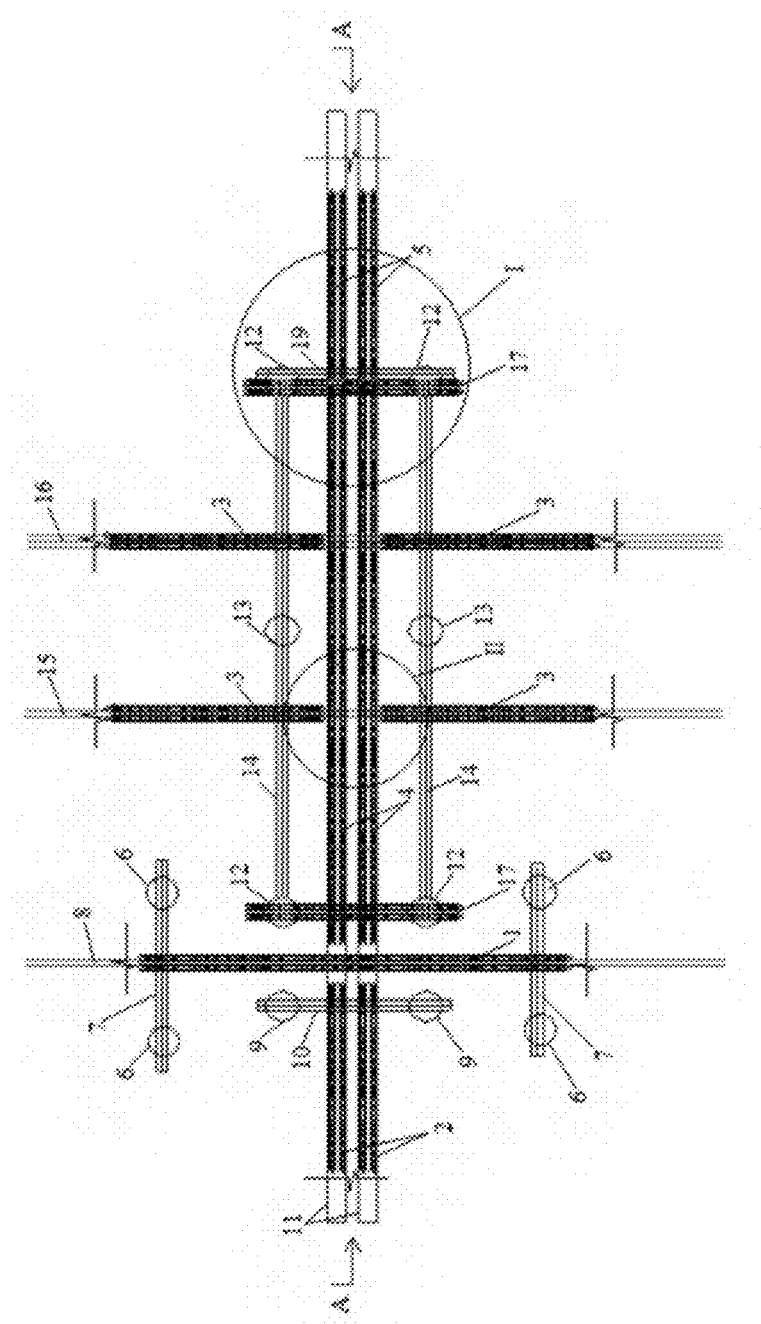
FIG. 1 is a vertical view of a Bailey support system applied to cross protection of complex pipes and cables in an intersection tunnel according to the present invention.
Figure 2:
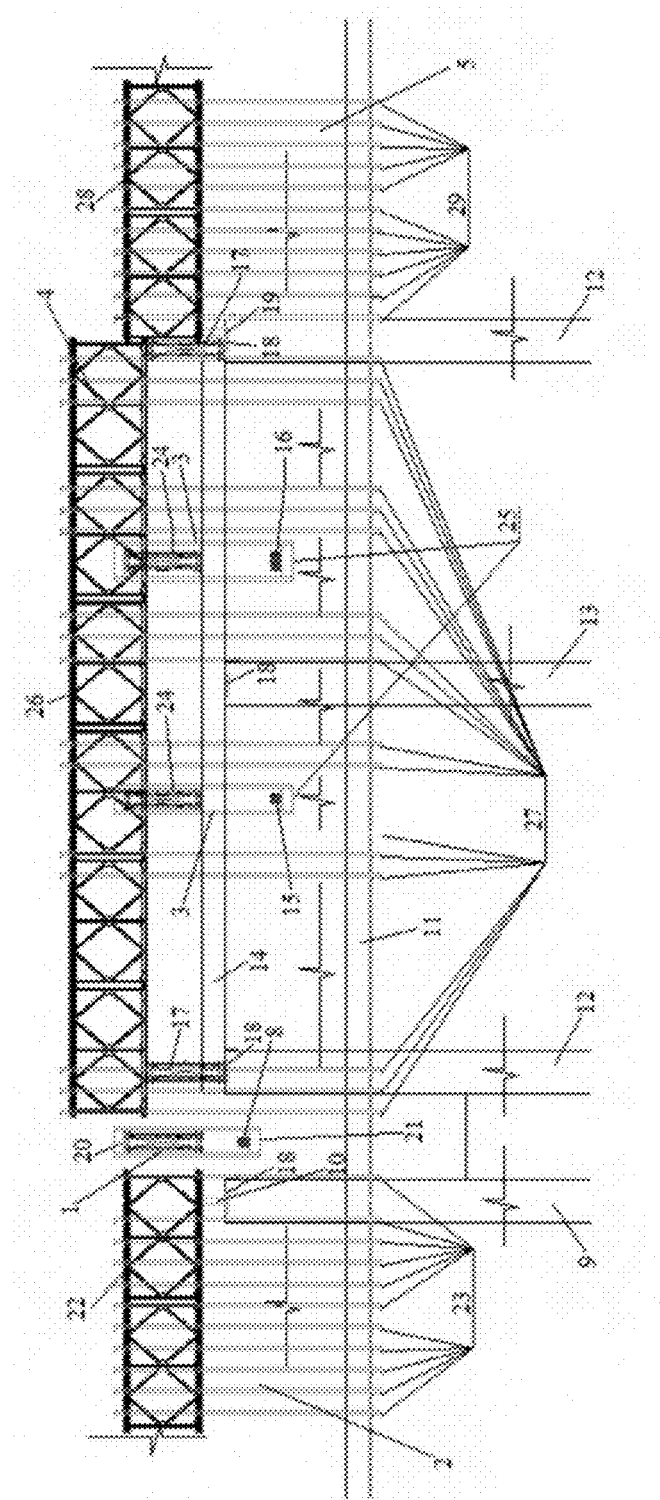
FIG. 2 is a schematic view of a cross-section A-A in FIG. 1 according to the present invention.
Figure 3:
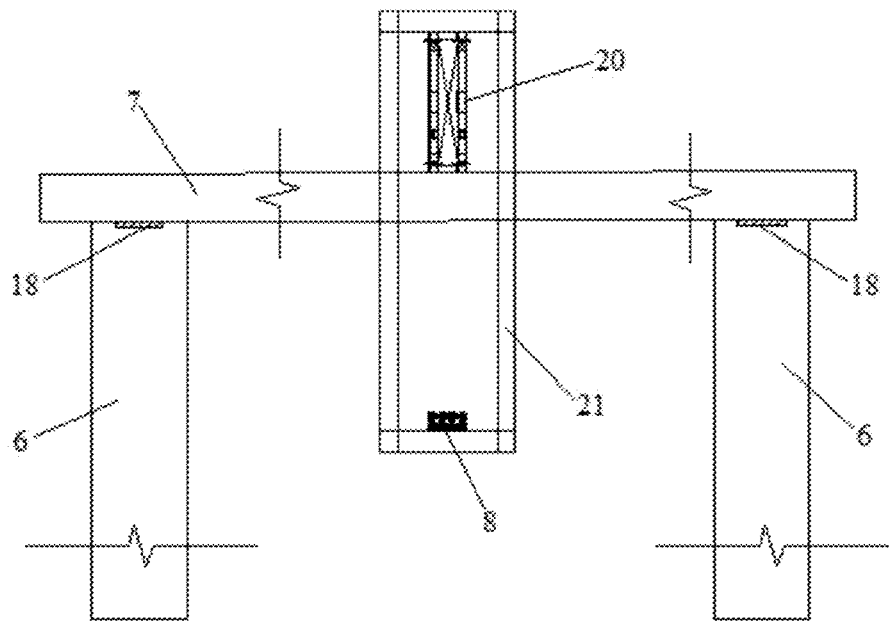
FIG. 3 is a front view of a type I suspension system according to the present invention.
Figure 4:
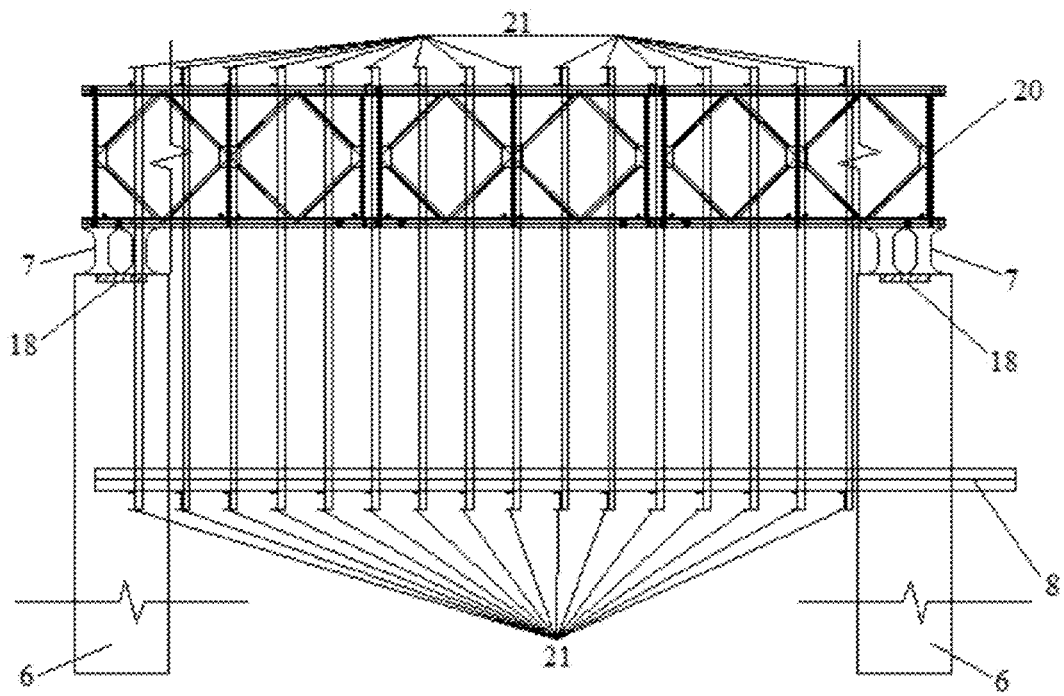
FIG. 4 is a side view of the type I suspension system according to the present invention.
Figure 5:
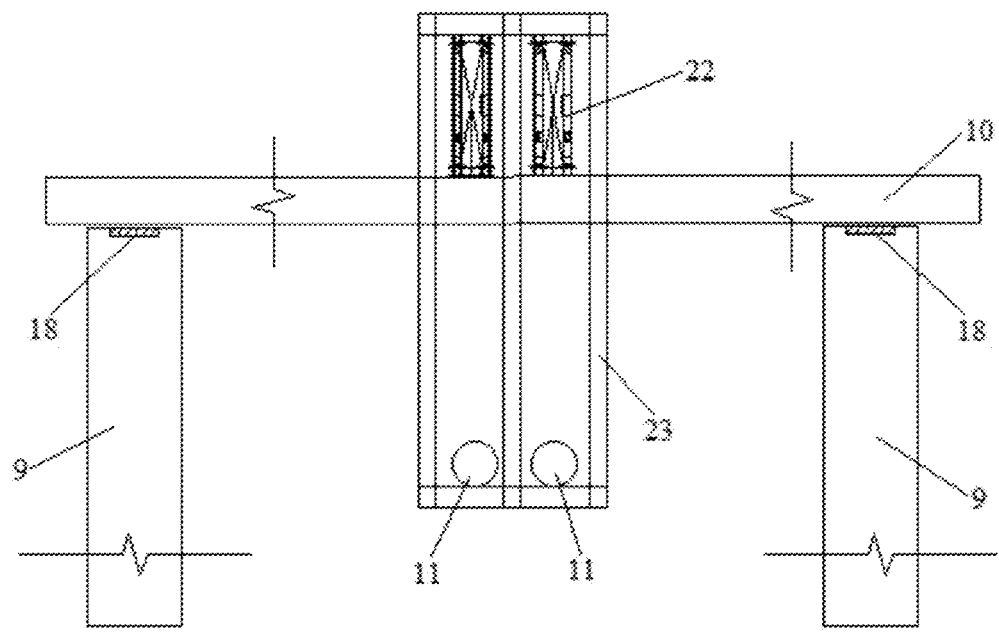
FIG. 5 is a side view of a type II suspension system according to the present invention.
Figure 6:
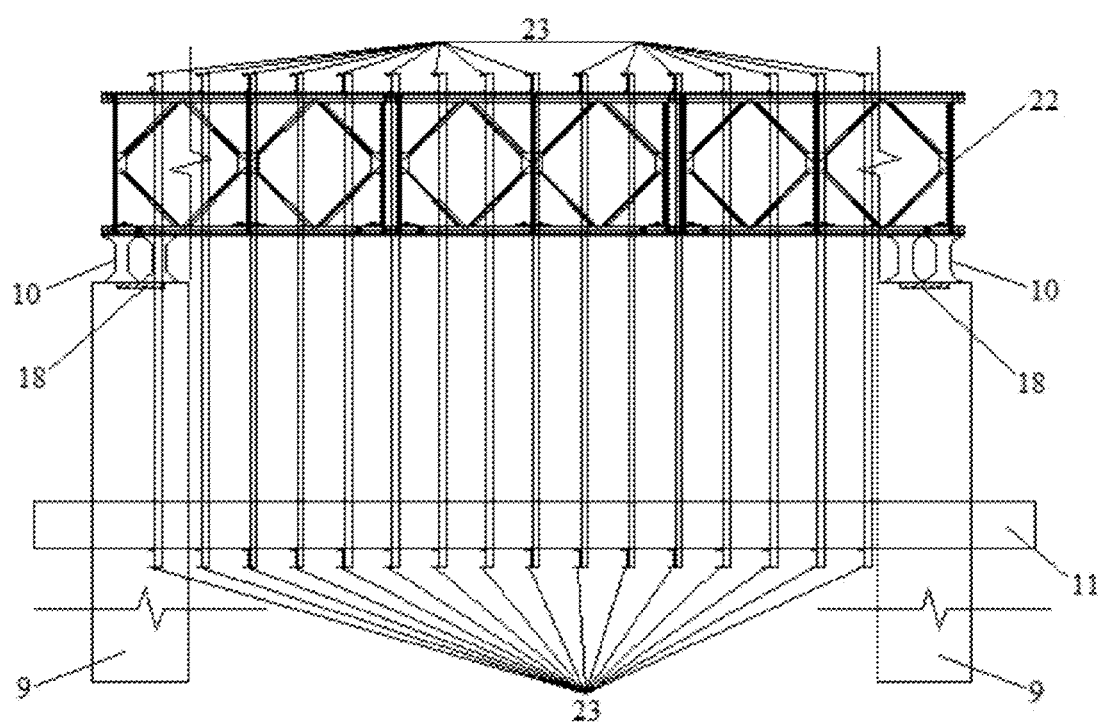
FIG. 6 is a front view of the type II suspension system according to the present invention.
Figure 7:
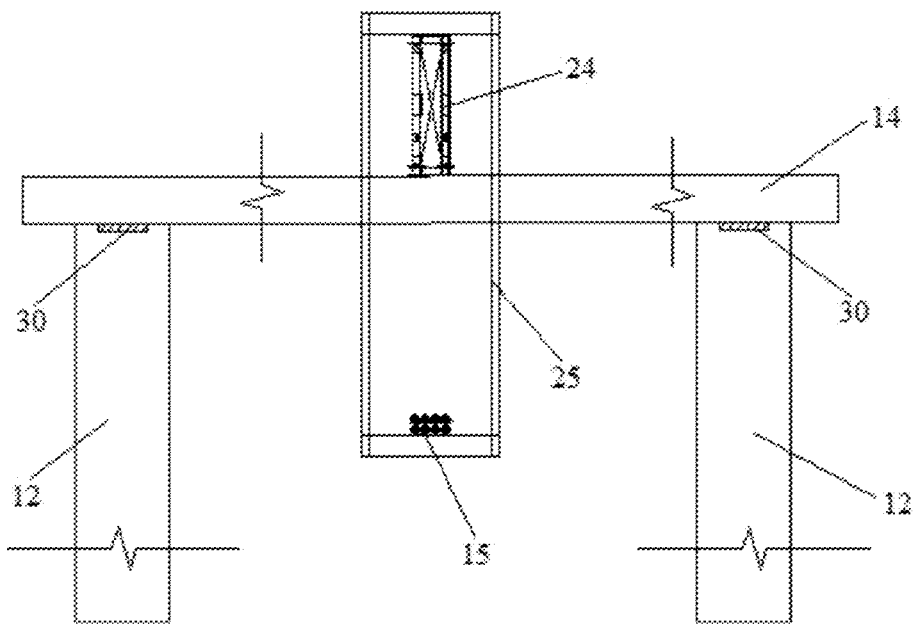
FIG. 7 is a front view of a type III suspension system according to the present invention.
Figure 8:
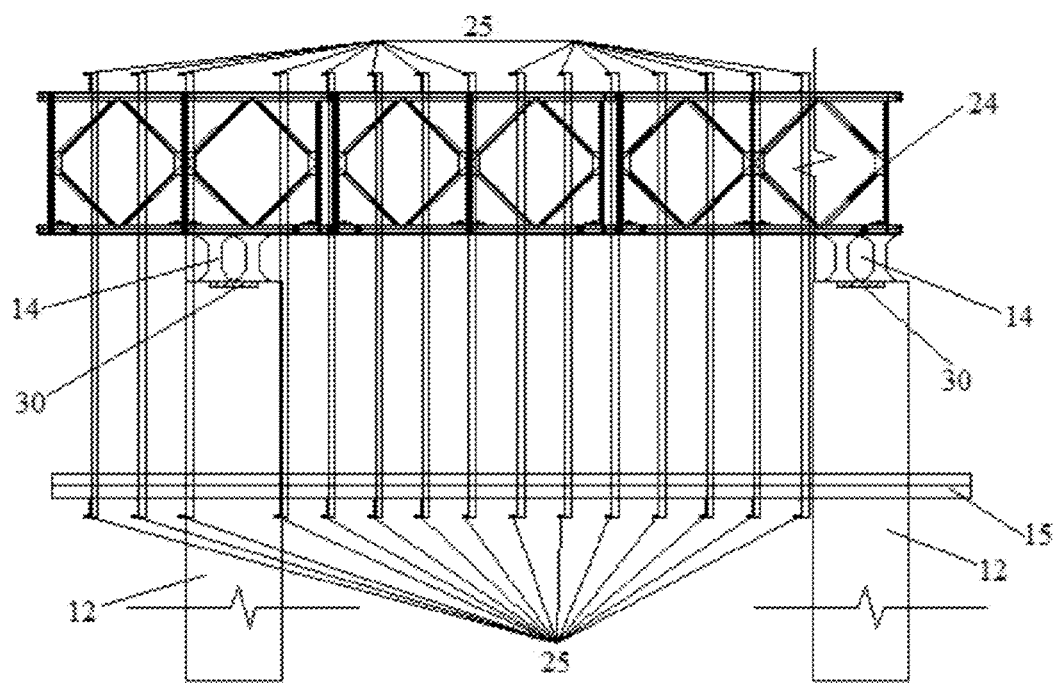
FIG. 8 is a side view of the type III suspension system according to the present invention.
Figure 9:
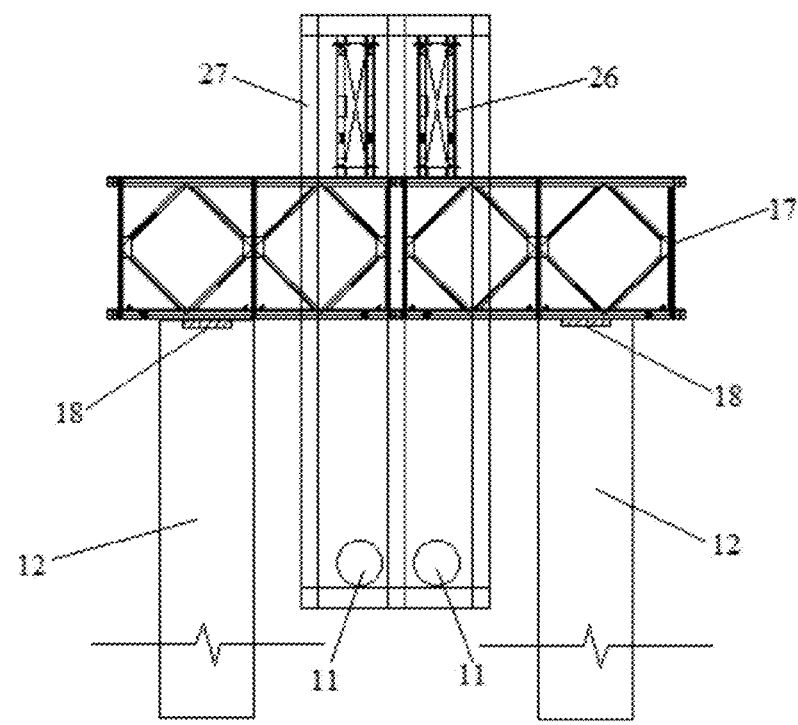
FIG. 9 is a side view of a type IV suspension system according to the present invention.
Figure 10:
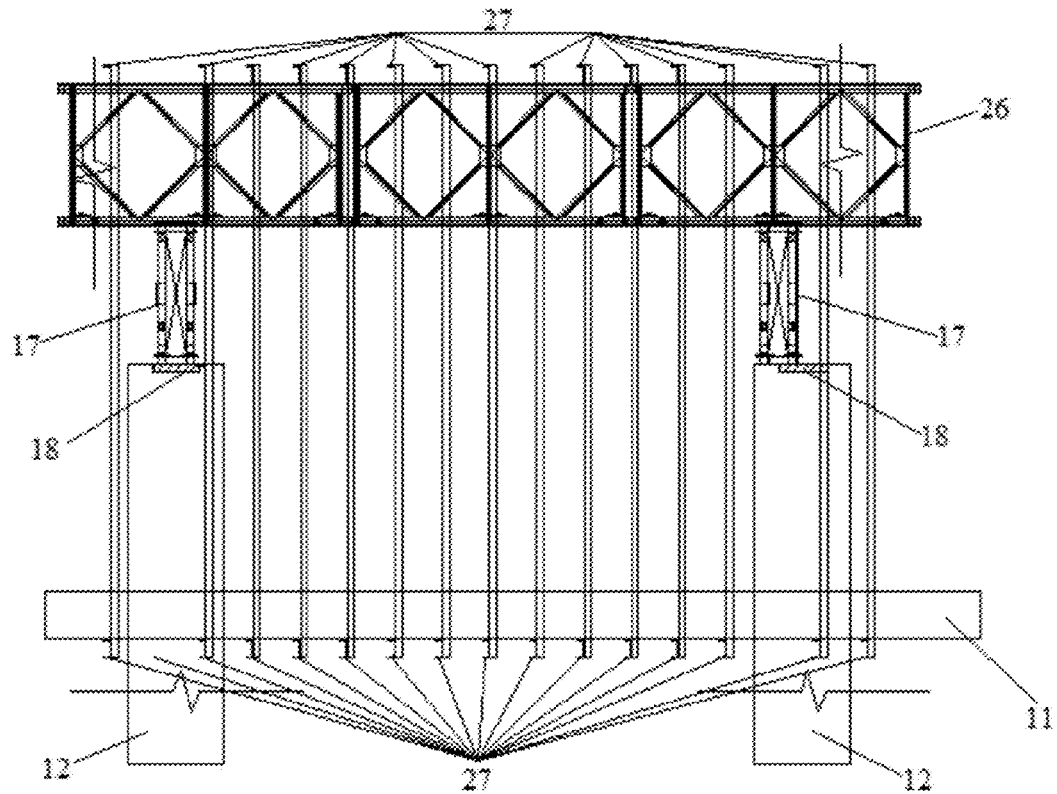
FIG. 10 is a front view of the type IV suspension system according to the present invention.
Figure 11:
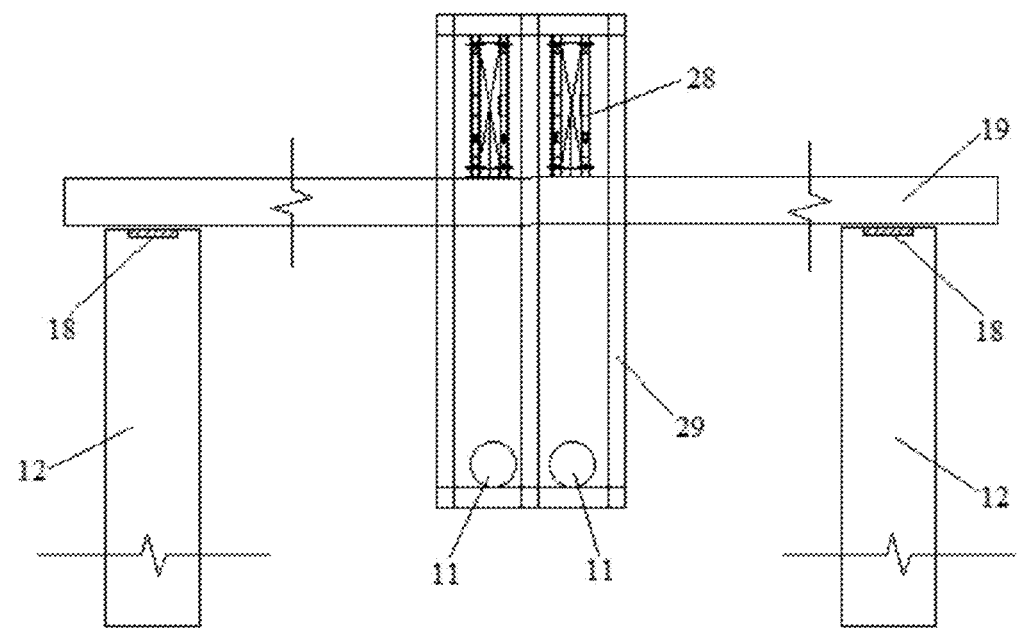
FIG. 11 is a side view of a type V suspension system according to the present invention.
Figure 12:
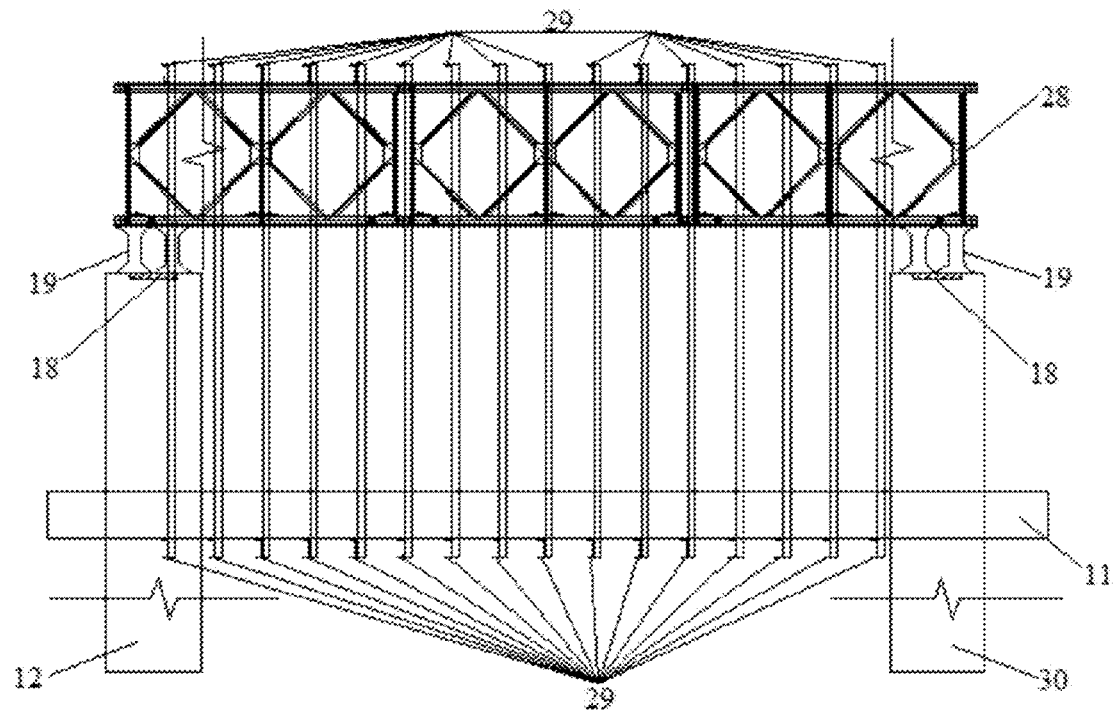
FIG. 12 is a front view of the type V suspension system according to the present invention.
Figure 13:
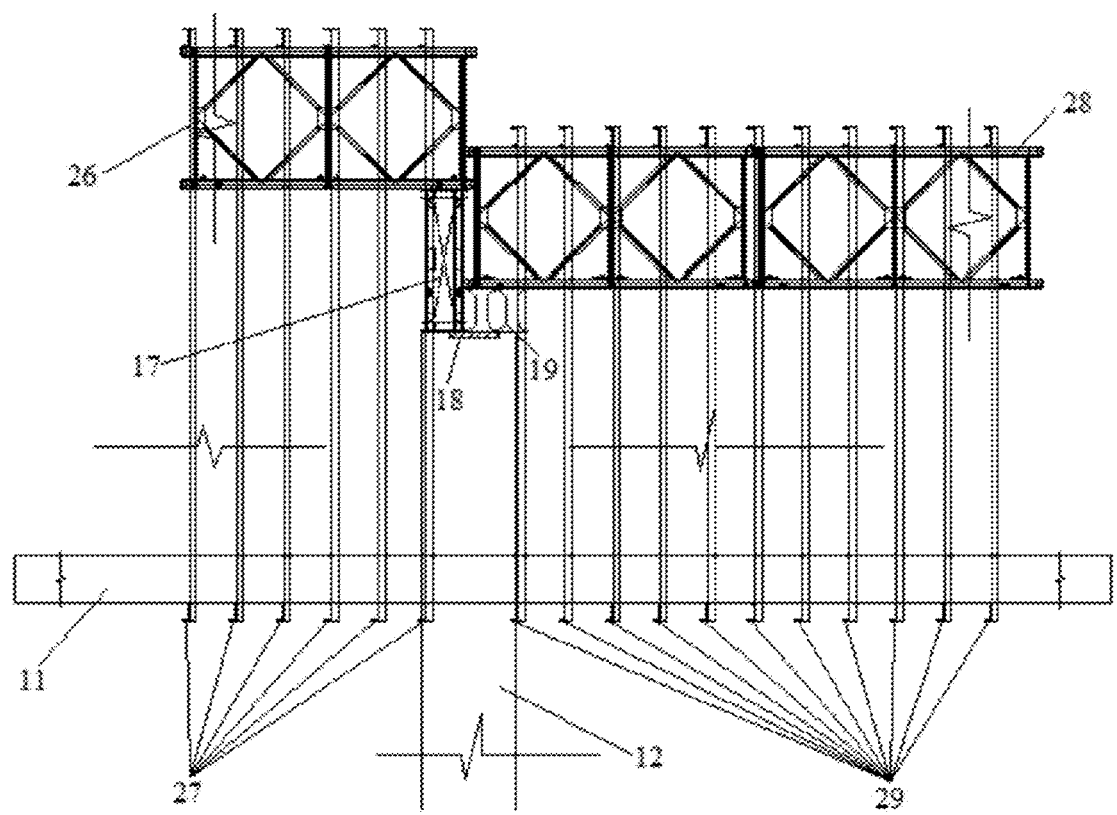
FIG. 13 is a front view of a position I in FIG. 1 according to the present invention.
Figure 14:
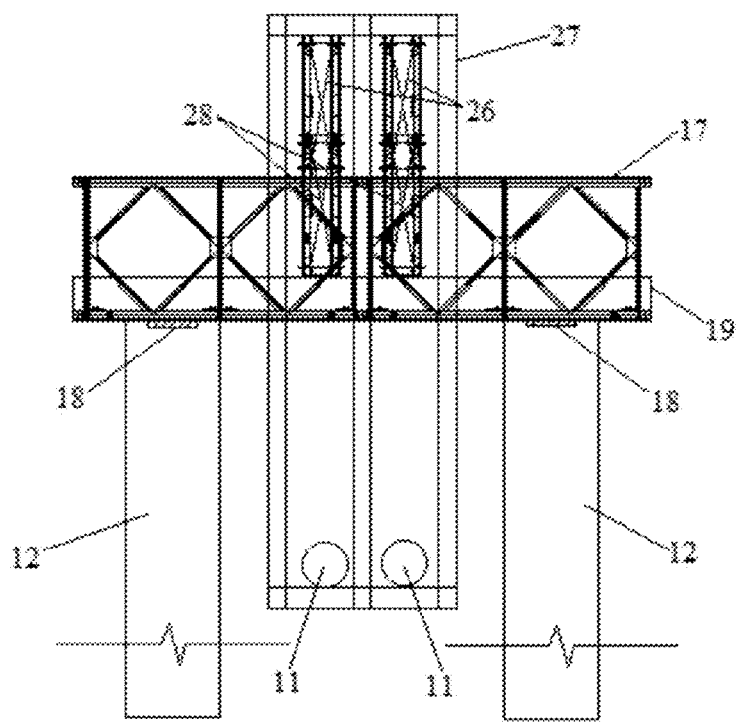
FIG. 14 is a side view of the position I in FIG. 1 according to the present invention.
Figure 15:
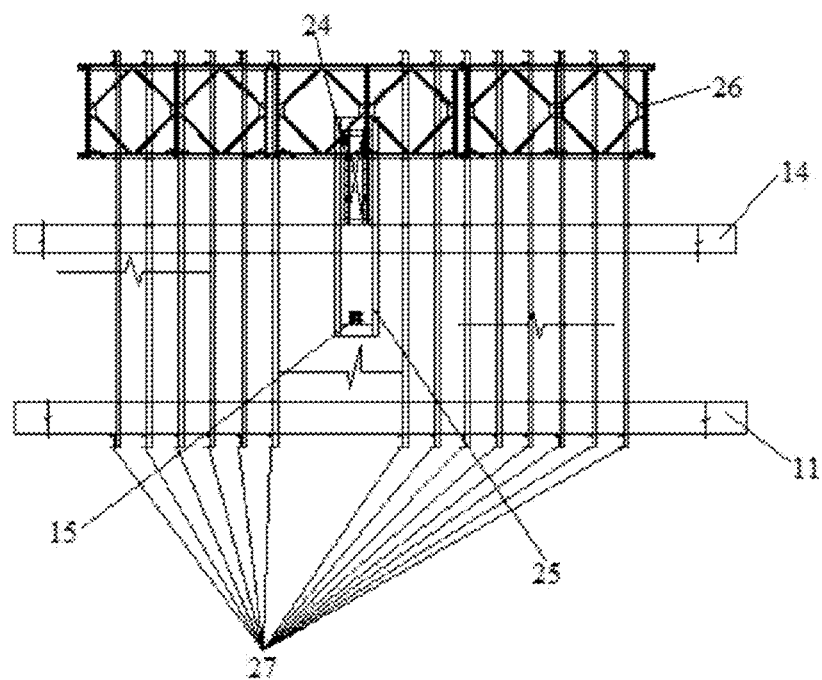
FIG. 15 is a front view of a position II in FIG. 1 of the present invention.
Figure 16:
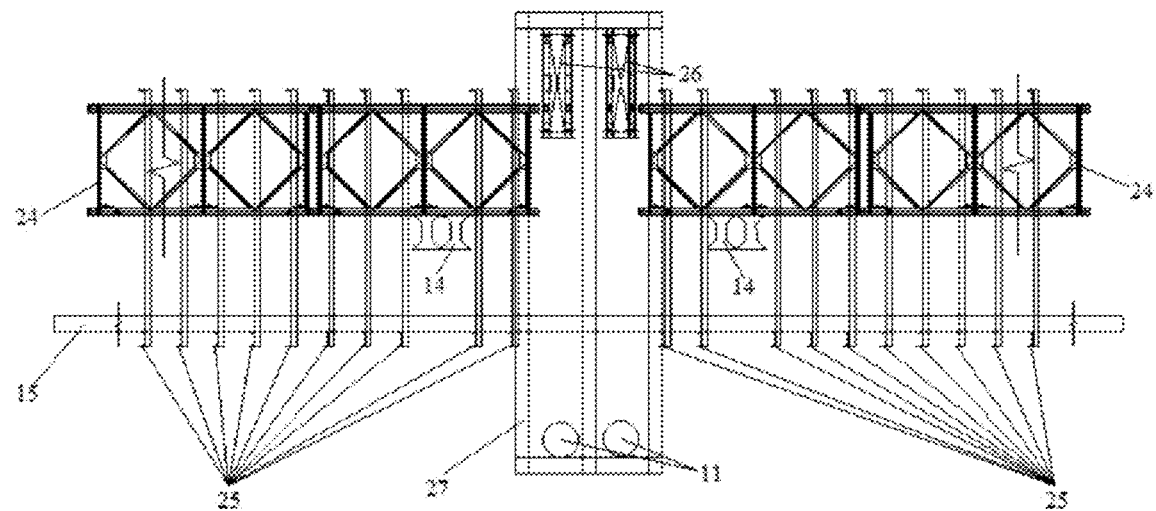
FIG. 16 is a side view of the position II in FIG. 1 according to the present invention.

As shown in FIG. 1 to FIG. 16, the present embodiment provides a Bailey support system applied to cross protection of complex pipes and cables in an intersection tunnel, including a type I suspension system 1, a type II suspension system 2, type III suspension systems 3, a type IV suspension system 4, and a type V suspension system 5, where the type III suspension systems 3 are divided into four groups, two groups of the type III suspension systems 3 are disposed on the front side of the type IV suspension system 4, and the other two groups of the type III suspension systems 3 are disposed on the rear side of the type IV suspension system 4 and are in one-to-one correspondence with the two groups of the type III suspension systems 3 disposed on the front side, the type II suspension system 2 and the type I suspension system 1 are sequentially disposed on a left side of the type IV suspension system 4 from left to right, and the type V suspension system 5 is disposed on a right side of the type IV suspension system 4. The type II suspension system 2, the type IV suspension system 4 and the type V suspension system 5 are parallel to each other, and the type I suspension system 1 and the type III suspension system 3 are parallel to each other and are perpendicular to the type II suspension system 2.

The type I suspension system 1 and the type III suspension system 3 have a same structure. Specifically, the type I suspension system 1 includes a first I-shaped steel assembly 7, a first Bailey support assembly 20, a first suspension device 21 and a first drilled pile 6. Two ends of the first Bailey support assembly 20 are respectively in lap joint with the first I-shaped steel assembly 7, two ends of the first I-shaped steel assembly 7 are respectively in lap joint with the first drilled pile 6, an upper end of the first suspension device 21 is in lap joint with an upper side of the first Bailey support assembly 20, and a lower end of the first suspension device 21 is configured to support a first pipeline 8. Specifically, the first pipeline 8 is a 10 KV high-voltage line. Specifically, the type III suspension system 3 includes third I-shaped steel assemblies 14, a third Bailey support assembly 24, third suspension devices 25, third drilled piles 12 and a fourth drilled pile 13. Two ends of the third Bailey support assembly 24 are respectively in lap joint with the third I-shaped steel assembly 14, two ends of the third I-shaped steel assembly 14 are respectively in lap joint with the third drilled pile 12, and a middle portion of the third I-shaped steel assembly 14 is in lap joint with the fourth drilled pile 13; the middle portion of the third I-shaped steel assembly 14 is supported through the fourth drilled pile 13, an upper end of the third suspension device 25 is in lap joint with an upper side of the third Bailey support assembly 24, and lower ends of two groups of third suspension devices 25 corresponding in a front-rear mode are configured to support a second pipeline 15. Specifically, the second pipeline 15 is a 10 KV high-voltage line, and lower ends of the other two groups of third suspension device 25 are configured to support a third pipeline 16. Specifically, the third pipeline 16 is a 60 KV high-voltage line.

The type II suspension system 2 and the type V suspension system 5 have a same structure. Specifically, the type II suspension system 2 includes second I-shaped steel assemblies 10, a second Bailey support assembly 22, a second suspension device 23 and a second drilled pile 9. Two ends of the second Bailey support assembly 22 are respectively in lap joint with the second I-shaped steel assembly 10, two ends of the second I-shaped steel assembly 10 are respectively in lap joint with the second drilled pile 9, an upper end of the second suspension device 23 is in lap joint with an upper side of the second Bailey support assembly 22, and a lower end of the second suspension device 23 is configured to support a heating pipeline 11. The type V suspension system 5 includes fourth I-shaped steel assemblies 19, a fifth Bailey support assembly 28, a fifth suspension device 29 and a fifth drilled pile 30. Two ends of the fifth Bailey support assembly 28 are respectively in lap joint with the fourth I-shaped steel assembly 19, two ends of one of the fourth I-shaped steel assemblies 19 are respectively in lap joint with the third drilled pile 12, two ends of another fourth I-shaped steel assembly 19 are respectively in lap joint with the fifth drilled pile 30, an upper end of the fifth suspension device 29 is in lap joint with an upper side of the fifth Bailey support assembly 28, and a lower end of the fifth suspension device 29 is configured to support the heating pipeline 11.

The type IV suspension system 4 includes supporting Bailey support assemblies 17, a fourth Bailey support assembly 26 and a fourth suspension device 27. Two ends of the fourth Bailey support assembly 26 are respectively in lap joint with the supporting Bailey support assembly 17, two ends of the supporting Bailey support assembly 17 are respectively in lap joint with the third drilled pile 12, the fourth Bailey support assembly 26 is perpendicular to the supporting Bailey support assembly 17, an upper end of the fourth suspension device 27 is in lap joint with an upper side of the fourth Bailey support assembly 26, and a lower end of the fourth suspension device 27 is configured to support the heating pipeline 11.

More specifically, the number of the second Bailey support assemblies 22, the fourth Bailey support assemblies 26 and the fifth Bailey support assemblies 28 matches the heating pipelines 11. The first Bailey support assembly 20, the second Bailey support assembly 22, the third Bailey support assembly 24, the fourth Bailey support assembly 26, the fifth Bailey support assembly 28 and the supporting Bailey support assembly 17 preferably adopt two Bailey supports as a group, and the horizontal distance between the two Bailey supports is 30 cm. The two Bailey supports are fixed to be a whole by using a supporting frame. Each Bailey support in the longitudinal direction is connected by a steel pin, and the Bailey supports are connected according to the spacing between and lengths of drilled piles at two ends of a pipeline. The first suspension device 21, the second suspension device 23, the third suspension device 25, the fourth suspension device 27 and the fifth suspension device 29 are each a frame made of groove steel. More specifically, the frame includes upper groove steel, vertical groove steel and bottom groove steel. The upper groove steel and the bottom groove steel are respectively welded to one end of the vertical groove steel. The first I-shaped steel assembly 7, the second I-shaped steel assembly 10, the third I-shaped steel assembly 14 and the fourth I-shaped steel assembly 19 are each formed by welding two bars of 45a I-shaped steel side by side. The first drilled pile 6, the second drilled pile 9, the third drilled pile 12, the fourth drilled pile 13 and the fifth drilled pile 30 have a same structure. The first drilled pile 6 includes a reinforcement cage and an embedded steel plate 18 disposed in the reinforcement cage, and concrete is adopted for filling between the reinforcement cage and the embedded steel plate 18.

The present embodiment further provides a method for construction of the aforementioned Bailey support system applied to cross protection of complex pipes and cables in an intersection tunnel, including the following steps:

Step S1: according to a distribution diagram of an underground pipe network, detect all the underground pipe network, relocate pipelines that can be relocated, expose all pipelines that cannot be relocated so that drilled pile construction can be performed to avoid accidents caused by a deviation between an actual position and a position on a drawing, especially for a heating pipeline 11, a 10 KV high-voltage line of a light rail, a 10 KV high-voltage line and a 60 KV high-voltage line.

Step S2: determine positions of a first drilled pile 6, a second drilled pile 9, a third drilled pile 12, a fourth drilled pile 13 and a fifth drilled pile 30 according to the position of the underground pipe network obtained by detection in conjunction with the actual situation on site; specifically, specifically set the specific number of the drilled piles according to actual demands; a drilling rig enters a site to carry out the construction of the drilled piles; after pile holes are formed, lift a reinforcement cage; after the reinforcement cage is in place, install an embedded steel plate 18 at the top end of the middle position of the reinforcement cage, and after the installation is in place, pour concrete between the reinforcement cage and the embedded steel plate 18.

Step S3: after a curing period of the drilled piles is due, entrust an external laboratory to experiment test blocks under the same condition to determine whether the concrete strength reaches the strength requirements; when the concrete reaches the strength, remove pile heads of the first drilled pile 6, the second drilled pile 9, the third drilled pile 12, the fourth drilled pile 13 and the fifth drilled pile 30, remove concrete around the embedded steel plate 18, and cut pile tops of the first drilled pile 6, the second drilled pile 9, the third drilled pile 12, the fourth drilled pile 13 and the fifth drilled pile 30 into planes.

Step S4: respectively measure distances between two first drilled piles 6, the second drilled pile 9, the third drilled pile 12 and the fifth drilled pile 30 and record data, cut a first I-shaped steel assembly 7, a second I-shaped steel assembly 10, a third I-shaped steel assembly 14 and a fourth I-shaped steel assembly 19 according to the recorded data, and cause the lengths of the first I-shaped steel assembly 7, the second I-shaped steel assembly 10, the third I-shaped steel assembly 14 and the fourth I-shaped steel assembly 19 to be according to the recorded data+1000 mm to ensure tension lengths of the first I-shaped steel assembly 7, the second I-shaped steel assembly 10, the third I-shaped steel assembly 14 and the fourth I-shaped steel assembly 19 on the first drilled pile 6, the second drilled pile 9, the third drilled pile 12, and the fifth drilled pile 30 respectively.

Step S5: draw a center line on the embedded steel plate 18 of the first drilled piles 6, the second drilled pile 9, the third drilled pile 12, the fourth drilled pile 13 and the fifth drilled pile 30, symmetrically arrange and weld the first I-shaped steel assembly 7, the second I-shaped steel assembly 10, the third I-shaped steel assembly 14 and the fourth I-shaped steel assembly 19 respectively along the center line of the corresponding embedded steel plate 18, and at the same time respectively weld two bars of 45a I-shaped steel of the first I-shaped steel assembly 7, the second I-shaped steel assembly 10, the third I-shaped steel assembly 14 and the fourth I-shaped steel assembly 19 into a whole.

Step S6: place two groups of supporting Bailey support assemblies 26 on two fourth drilled piles 13 respectively, and weld two ends of the supporting Bailey support assembly 26 to the corresponding embedded steel plate 18.

Step S7: install and weld a second Bailey support assembly 22 on the second I-shaped steel assembly 10, weld inclined struts on two sides of the second Bailey support assembly 22 to ensure the stability of the second Bailey support assembly 22; install and weld a first Bailey support assembly 20 on the first I-shaped steel assembly 7, and weld inclined struts on two sides of the first Bailey support assembly 20 to ensure the stability of the first Bailey support assembly 20; install and weld fourth Bailey support assemblies 26 on two groups of supporting Bailey support assemblies 17, and weld inclined struts on the two sides of the fourth Bailey support assemblies 26 and the supporting Bailey support assemblies 17, to ensure stability of the fourth Bailey support assemblies 26 and the supporting Bailey support assemblies 17; install and weld a fifth Bailey support assembly 28 on the fourth I-shaped steel assembly 19, and weld inclined struts on two sides of the fifth Bailey support assembly 28 to ensure the stability of the fifth Bailey support assembly 28; install and weld two groups of third Bailey support assemblies 24 on two groups of third I-shaped steel assemblies 14 respectively, and weld inclined struts on two sides of the third Bailey support assemblies 24 to ensure stability of the third Bailey support assemblies 24; and specifically, the aforementioned inclined struts are preferably 20*a* groove steel.

Step S8: first carry out material preparation and blanking of groove steel needed for a first suspension device 21, a second suspension device 23, a third suspension device 25, a fourth suspension device 27 and a fifth suspension device 29 according to drawings and the on-site practice; where upper horizontal groove steel and vertical groove steel of the first suspension device 21, the second suspension device 23, the third suspension device 25, the fourth suspension device 27 and the fifth suspension device 29 can be first welded into an upper structure for use, bottom groove steel is welded to the upper structure when to be used; install the first suspension device 21, the second suspension device 23, the third suspension device 25, the fourth suspension device 27 and the fifth suspension device 29 on the first Bailey support assembly 20, the second Bailey support assembly 22, the third Bailey support assembly 24, the fourth Bailey support assembly 26 and the fifth Bailey support assembly 28 respectively; specifically, manually dig transverse holes from the lower portion of a pipeline at intervals of 100 cm, make the bottom groove steel pass through the transverse holes, place upper structures of the welded first suspension device 21, second suspension device 23, third suspension device 25, fourth suspension device 27 and fifth suspension device 29 on the first Bailey support assembly 20, the second Bailey support assembly 22, the third Bailey support assembly 24, the fourth Bailey support assembly 26 and the fifth Bailey support assembly 28 respectively; use, by two workers, the bottom groove steel to abut against the pipeline, and perform welding simultaneously by two welders on two sides; connect the bottom groove steel to the vertical groove steel in the upper structure to form a whole; after the aforementioned operation is completed, use an excavator to cooperate with labor, and perform digging gradually from one end to the other end; make 6 workers cooperate to infill a frame, and add a frame at the middle of a fixed hanging bracket system; after a soil layer on the lower portion of the pipeline is excavated, form a frame at intervals of 50 cm, so that the pipeline is all supported on the bottom groove steel to form the first suspension device 21, the second suspension device 23, the third suspension device 25, the fourth suspension device 27 and the fifth suspension device 29 to ensure the safety of a first pipeline 8, a second pipeline 15, a third pipeline 16 and a heating pipeline 9.

step S9: after the construction of a main body of an underground passage is completed, adopt a support underpinning method to underpin the underground first pipeline 8, the second pipeline 15, the third pipeline 16 and the heating pipeline 11 at an underground passage top plate; after the underpinning is completed, first remove the first suspension device 21, the second suspension device 23, the third suspension device 25, the fourth suspension device 27 and the fifth suspension device 29 and then use a tower crane to dismantle the first Bailey support assembly 20, the second Bailey support assembly 22, the third Bailey support assembly 24, the fourth Bailey support assembly 26 and the fifth Bailey support assembly 28, then remove the first I-shaped steel assembly 7, the second I-shaped steel assembly 10, the third I-shaped steel assembly 14, the fourth I-shaped steel assembly 19 and the supporting Bailey support 17, and finally remove the first drilled pile 6, the second drilled pile 9, the third drilled pile 12, the fourth drilled pile 13 and the fifth drilled pile 30.

The Bailey support system applied to cross protection of complex pipes and cables in an intersection tunnel and the construction method thereof in the present embodiment can avoid the heightening of a support pile and avoid the safety risk. At the same time, a Bailey support assembly overlaying system is safe and reliable, simple in structure and convenient to construct. A Bailey support assembly can be rented, and an I-shaped steel assembly and a suspension device used by a hanging bracket system can be recycled. The present invention is simple and practical, saves cost and has good economy. The construction is convenient, and a large device and a large number of professionals are not needed.

Several examples are used for illustration of the principles and implementation methods of the present invention. The description of the embodiments is used to help illustrate the method and its core principles of the present invention. In addition, those skilled in the art can make various modifications in terms of specific embodiments and scope of application in accordance with the teachings of the present invention. In conclusion, the content of this specification shall not be construed as a limitation to the present invention.

What is claimed is:

1. A Bailey support system applied to cross protection of complex pipes and cables in an intersection tunnel, comprising:
    a type I suspension system,
    a type II suspension system,
    type III suspension systems that each have a same structure as the type I suspension system,
    a type IV suspension system, and
    a type V suspension system that has a same structure as the type II suspension system, and the type IV suspension system has a different structure from the type I suspension system, the type II suspension system, the type III suspension systems, and the type V suspension system;
    wherein the type III suspension systems are divided into four groups, two groups of the type III suspension systems are disposed on a front side of the type IV suspension system, and the other two groups of the type III suspension systems are disposed on a rear side of the type IV suspension system and are in one-to-one correspondence with the two groups of the type III suspension systems disposed on the front side, the type II suspension system and the type I suspension system are sequentially disposed on a left side of the type IV suspension system from left to right, and the type V suspension system is disposed on a right side of the type IV suspension system; the type II suspension system comprises a second Bailey support assembly, the type IV suspension system comprises a fourth Bailey support assembly, the type V suspension system comprises a fifth Bailey support assembly; the second Bailey support assembly, the fourth Bailey support assembly and the fifth Bailey support assembly are parallel to each other along an arrangement direction of the type II suspension system, the type IV suspension system and the type V suspension system; and the type II suspension system, the type IV suspension system and the type V suspension system are parallel to each other; and the type I suspension system comprises a first Bailey support assembly, and the type III suspension systems each comprise a third Bailey support assembly, the first Bailey support assembly and the third Bailey support assembly are parallel to each other in a direction perpendicular to the arrangement direction and are perpendicular to the second Bailey support assembly of the type II suspension system, wherein the type I suspension system comprises at least two first I-shaped assemblies, a first suspension device and first drilled piles, wherein each of two ends of the first Bailey support assembly is in lap joint with a corresponding one of the at least two first I-shaped steel assemblies, each of the at least two first I-shaped steel assemblies comprises two ends which are arranged in the arrangement direction, each of the two ends is in lap joint with a corresponding one of the first drilled piles, an upper end of the first suspension devise is in lap joint with an upper side of the first Bailey support assembly, and a lower end of the first suspension device is configured to support a first pipeline; each of the type III suspension systems comprises third I-shaped steel assemblies, third suspension devices, third drilled piles and fourth drilled piles, wherein each of two ends of the third Bailey support assembly is in lap joint with a corresponding one of the third I-shaped steel assemblies, each of the third I-shaped steel assemblies comprises two ends which are arranged in the arrangement direction, each of the two ends is in lap joint with a corresponding one of the third drilled piles, and a middle portion of each of the third I-shaped steel assemblies is in lap joint with a corresponding one of the fourth drilled piles, an upper end of each of the third suspension devices is in lap joint with an upper side of the third Bailey support assembly, lower ends of the third suspension devices of one of the two groups of the type suspension systems and one of the other two groups which are corresponding in a front-rear mode are configured to support a second pipeline, and lower ends of the third suspension devices of another one of the two groups of the type suspension systems and another one of the other two groups which are corresponding in the front-rear mode are configured to support a third pipeline.

2. The Bailey support system applied to cross protection of complex pipes and cables in an intersection tunnel according to claim 1, wherein the type II suspension system comprises at least two second I-shaped steel assemblies, a second suspension device and a-second drilled piles, wherein each of two ends of the second Bailey support assembly is in lap joint with a corresponding one of the at least two second I-shaped steel assemblies, each of the at least two second I-shaped steel assemblies comprises two ends which are arranged in a direction perpendicular to the arrangement direction, each of the two ends is in lap joint with a corresponding one of the second drilled piles, an upper end of the second suspension device is in lap joint with an upper side of the second Bailey support assembly, and a lower end of the second suspension device is configured to support a heating pipeline; the type V suspension system comprises fourth I-shaped steel assemblies, a fifth suspension device and fifth drilled piles, wherein each of two ends of the fifth Bailey support assembly is in lap joint with a corresponding one of the fourth I-shaped steel assemblies, each of the fourth I-shaped steel assemblies comprises two ends which are arranged in the direction perpendicular to the arrangement direction, each of the two ends is in lap joint with a corresponding one of the third drilled piles, another one of the fourth I-shaped steel assemblies comprises two ends which are arranged in the direction perpendicular to the arrangement direction, each of the two ends is in lap joint with a corresponding one of the fifth drilled piles, an upper end of the fifth suspension device is in lap joint with an upper side of the fifth Bailey support assembly, and a lower end of the fifth suspension device is configured to support the heating pipeline.

3. The Bailey support system applied to cross protection of complex pipes and cables in an intersection tunnel according to claim 2, wherein the type IV suspension system comprises supporting Bailey support assemblies, and a fourth suspension device, wherein each of two ends of the fourth Bailey support assembly is in lap joint with a corresponding one of the supporting Bailey support assemblies, each of the supporting Bailey support assemblies comprises two ends which are arranged in the direction perpendicular to the arrangement direction, each of the two ends is in lap joint with a corresponding one of the third drilled piles, the fourth Bailey support assembly is perpendicular to the supporting Bailey support assemblies, an upper end of the fourth suspension device is in lap joint with an upper side of the fourth Bailey support assembly, and a lower end of the fourth suspension device is configured to support the heating pipeline.

4. The Bailey support system applied to cross protection of complex pipes and cables in an intersection tunnel according to claim 3, wherein the number of the second Bailey support assembly, the fourth Bailey support assembly and the fifth Bailey support assembly matches the heating pipelines.

5. The Bailey support system applied to cross protection of complex pipes and cables in an intersection tunnel according to claim 3, wherein the first suspension device, the second suspension device, the third suspension devices, the fourth suspension device and the fifth suspension device are each a frame made of groove steel.

6. The Bailey support system applied to cross protection of complex pipes and cables in an intersection tunnel according to claim 3, wherein the at least two first I-shaped steel assemblies, the at least two second I-shaped steel assemblies, the third I-shaped steel assemblies and the fourth I-shaped steel assemblies are each formed by welding two bars of 45 a I-shaped steel side by side.

7. The Bailey support system applied to cross protection of complex pipes and cables in an intersection tunnel according to claim 2, wherein the first drilled piles, the second drilled piles, the third drilled piles, the fourth drilled piles and the fifth drilled piles have a same structure, each of the first drilled piles, the second drilled piles, the third drilled piles, the fourth drilled piles and the fifth drilled piles comprises a reinforcement cage and an embedded steel plate disposed in the reinforcement cage, and concrete is adopted for filling between the reinforcement cage and the embedded steel plate.

8. A method for construction of the Bailey support system applied to cross protection of complex pipes and cables in an intersection tunnel according to claim 1, comprising the following steps:
- step S1: according to a distribution diagram of an underground pipe network, detecting all the underground pipe network;
- step S2: determining positions of the first drilled piles, second drilled piles which are comprised by the type II suspension system, the third drilled piles, the fourth drilled piles and fifth drilled piles which are comprised by the type V suspension system according to a position of the underground pipe network obtained by detection, a drilling rig entering a site to carry out construction of the first drilled piles, the second drilled piles, the third drilled piles, the fourth drilled piles and the fifth drilled piles, installing embedded steel plate in a middle position of a reinforcement cage of the each of the first drilled piles, the second drilled piles, the third drilled piles, the fourth drilled piles and the fifth drilled piles, and after the installation is in place, pouring concrete between the reinforcement cage and the embedded steel plate;
- step S3: when concrete reaches a strength, removing a pile head of the each of the first drilled piles, the second drilled piles, the third drilled piles, the fourth drilled piles and the fifth drilled piles, removing concrete around the embedded steel plate, and cutting a pile top of the each of the first drilled piles, the second drilled piles, the third drilled piles, the fourth drilled piles and the fifth drilled piles into a plane;
- step S4: respectively measuring a first distance between two of the first drilled piles, a second distance between two of the second drilled piles, a third distance between two of the third drilled piles and a fourth distance between two of the fifth drilled piles and recording data, cutting the at least two first I-shaped steel assemblies, at least two second I-shaped steel assemblies which are comprised by the type II suspension system, the third I-shaped steel assemblies and fourth I-shaped steel assemblies which are comprised by the type V suspension system according to the recorded data, causing the lengths of the at least two first I-shaped steel assemblies, the at least two second I-shaped steel assemblies, the third I-shaped steel assemblies and the fourth I-shaped steel assemblies to be according to the recorded data+1000 mm to ensure tension lengths of the at least two first I-shaped steel assemblies on the first drilled piles, the at least two second I-shaped steel assemblies on the second drilled piles, the third I-shaped steel assemblies on the third drilled piles, the one of the fourth I-shaped steel assemblies on the fifth drilled piles and the another one of the fourth I-shaped steel assemblies on the third drilled piles;
- step S5: drawing a center line on the embedded steel plate of the each of the first drilled piles, the second drilled piles, the third drilled piles, the fourth drilled piles and the fifth drilled piles, symmetrically arranging and welding the at least two first I-shaped steel assemblies, the at least two second I-shaped steel assemblies, the third I-shaped steel assemblies and the fourth I-shaped steel assemblies respectively along the center line, and at the same time respectively welding two bars of 45a I-shaped steel of the at least two first I-shaped steel assemblies, the at least two second I-shaped steel assemblies, the third I-shaped steel assemblies and the fourth I-shaped steel assemblies into a whole;
- step S6: placing two groups of supporting Bailey support assemblies which are comprised by the -type IV suspension system on the third drilled piles respectively, and welding each of two ends of the each of the two groups of the supporting Bailey support assemblies to a corresponding embedded steel plate of the third drilled piles;
- step S7: installing and welding the second Bailey support assembly on the at least two second I-shaped steel assemblies, installing and welding a first Bailey support assembly on the at least two first I-shaped steel assemblies, installing and welding the fourth Bailey support assembly on the two groups of the supporting Bailey support assemblies, installing and welding the fifth Bailey support assembly on the fourth I-shaped steel assemblies, installing and welding two groups of the third Bailey support assembly on two groups of the third I-shaped steel assemblies respectively, welding inclined struts on two sides of the first Bailey support assembly, the second Bailey support assembly, the third Bailey support assembly, the fourth Bailey support assembly, the fifth Bailey support assembly and the two groups of the supporting Bailey support assemblies, to ensure the stability of the first Bailey support assembly, the second Bailey support assembly, the third Bailey support assembly, the fourth Bailey support assembly, the fifth Bailey support assembly and the two groups of the supporting Bailey support assemblies;
- step S8: installing the first suspension device, a second suspension device which is comprised by the type II suspension system, the third suspension devices, a fourth suspension device which is comprised by the type IV suspension system, and a fifth suspension device which is comprised by the type V suspension system on the first Bailey support assembly, the second Bailey support assembly, the third Bailey support assembly, the fourth Bailey support assembly and the fifth Bailey support assembly respectively; and
- step S9: after the construction of a main body of an underground passage is completed, adopting a support underpinning method to underpin an underground pipeline and a heating pipeline at an underground passage top plate; after the underpinning is completed, first removing the first suspension device, the second suspension device, the third suspension devices, the fourth suspension device and the fifth suspension device and then using a tower crane to dismantle the first Bailey support assembly, the second Bailey support assembly, the third Bailey support assembly, the fourth Bailey support assembly and the fifth Bailey support assembly, then removing the at least two first I-shaped steel assemblies, the at least two second I-shaped steel assemblies, the third I-shaped steel assemblies, the fourth I-shaped steel assemblies and the two groups of the supporting Bailey support assemblies, and finally removing the first drilled piles, the second drilled piles, the third drilled piles, the fourth drilled piles and the fifth drilled piles.

9. A method for construction of the Bailey support system applied to cross protection of complex pipes and cables in an intersection tunnel according to claim 2, comprising the following steps:

step S1: according to a distribution diagram of an underground pipe network, detecting all the underground pipe network;

step S2: determining positions of the first drilled piles, the second drilled piles, the third drilled piles, the fourth drilled piles and the fifth drilled piles according to a position of the underground pipe network obtained by detection, a drilling rig entering a site to carry out construction of the first drilled piles, the second drilled piles, the third drilled piles, the fourth drilled piles and the fifth drilled piles, installing embedded steel plate in a middle position of a reinforcement cage of the each of the first drilled piles, the second drilled piles, the third drilled piles, the fourth drilled piles and the fifth drilled piles, and after the installation is in place, pouring concrete between the reinforcement cage and the embedded steel plate;

step S3: when concrete reaches a strength, removing a pile head of the each of the first drilled piles, the second drilled piles, the third drilled piles, the fourth drilled piles and the fifth drilled piles, removing concrete around the embedded steel plate, and cutting a pile top of the each of the first drilled piles, the second drilled piles, the third drilled piles, the fourth drilled piles and the fifth piles into a plane;

step S4: respectively measuring a first distance between two of the first drilled piles, a second distance between two of the second drilled piles, a third distance between two of the third drilled piles and a fourth distance between two of the fifth drilled piles and recording data, cutting the at least two first I-shaped steel assemblies, the at least two second I-shaped steel assemblies, the third I-shaped steel assemblies and the fourth I-shaped steel assemblies according to the recorded data, causing the lengths of the at least two first I-shaped steel assemblies, the at least two second I-shaped steel assemblies, the third I-shaped steel assemblies and the fourth I-shaped steel assemblies to be according to the recorded data+1000 mm to ensure tension lengths of the at least two first I-shaped steel assemblies on the first drilled piles, the at least two second I-shaped steel assemblies on the second drilled piles, the third I-shaped steel assemblies on the third drilled piles, the one of the fourth I-shaped steel assemblies on the fifth drilled piles and the another one of the fourth I-shaped steel assemblies on the third drilled piles;

step S5: drawing a center line on the embedded steel plate of the each of the first drilled piles, the second drilled piles, the third drilled piles, the fourth drilled piles and the fifth drilled piles, symmetrically arranging and welding the at least two first I-shaped steel assemblies, the at least two second I-shaped steel assemblies, the third I-shaped steel assemblies and the fourth I-shaped steel assemblies respectively along the center line, and at the same time respectively welding two bars of 45 a I-shaped steel of the at least two first I-shaped steel assemblies, the at least two second I-shaped steel assemblies, the third I-shaped steel assemblies and the fourth I-shaped steel assemblies into a whole;

step S6: placing two groups of supporting Bailey support assemblies which are comprised by the type IV suspension system on the third drilled piles respectively, and welding each of two ends of the each of the two groups of the supporting Bailey support assemblies to a corresponding embedded steel plate of the third drilled piles;

step S7: installing and welding the second Bailey support assembly on the at least two second I-shaped steel assemblies, installing and welding a first Bailey support assembly on the at least two first I-shaped steel assemblies, installing and welding the fourth Bailey support assembly on the two groups of the supporting Bailey support assemblies, installing and welding the fifth Bailey support assembly on the fourth I-shaped steel assemblies, installing and welding two groups of the third Bailey support assembly on two groups of the third I-shaped steel assemblies respectively, welding inclined struts on two sides of the first Bailey support assembly, the second Bailey support assembly, the third Bailey support assembly, the fourth Bailey support assembly, the fifth Bailey support assembly and the two groups of the supporting Bailey support assemblies, to ensure the stability of the first Bailey support assembly, the second Bailey support assembly, the third Bailey support assembly, the fourth Bailey support assembly, the fifth Bailey support assembly and the two groups of the supporting Bailey support assemblies;

step S8: installing the first suspension device, the second suspension device, the third suspension devices, a fourth suspension device which is comprised by the type IV suspension system, and the fifth suspension device on the first Bailey support assembly, the second Bailey support assembly, the third Bailey support assembly, the fourth Bailey support assembly and the fifth Bailey support assembly respectively; and step S9: after the construction of a main body of an underground passage is completed, adopting a support underpinning method to underpin an underground pipeline and a heating pipeline at an underground passage top plate; after the underpinning is completed, first removing the first suspension device, the second suspension device, the third suspension devices, the fourth suspension device and the fifth suspension device and then using a tower crane to dismantle the first Bailey support assembly, the second Bailey support assembly, the third Bailey support assembly, the fourth Bailey support assembly and the fifth Bailey support assembly, then removing the at least two first I-shaped steel assemblies, the at least two second I-shaped steel assemblies, the third I-shaped steel assemblies, the fourth I-shaped steel assemblies and the two groups of the supporting Bailey support assemblies, and finally removing the first drilled piles, the second drilled piles, the third drilled piles, the fourth drilled piles and the fifth drilled piles.

10. A method for construction of the Bailey support system applied to cross protection of complex pipes and cables in an intersection tunnel according to claim 3, comprising the following steps:

step S1: according to a distribution diagram of an underground pipe network, detecting all the underground pipe network;

step S2: determining positions of the first drilled piles, the second drilled piles, the third drilled piles, the fourth drilled piles and the fifth drilled piles according to a position of the underground pipe network obtained by detection, a drilling rig entering a site to carry out construction of the first drilled piles, the second drilled piles, the third drilled piles, the fourth drilled piles and the fifth drilled piles, installing embedded steel plate in a middle position of a reinforcement cage of the each of the first drilled piles, the second drilled piles, the third drilled piles, the fourth drilled piles and the fifth drilled piles, and after the installation is in place, pouring concrete between the reinforcement cage and the embedded steel plate;

step S3: when concrete reaches a strength, removing a pile head of the each of the first drilled piles, the second drilled piles, the third drilled piles, the fourth drilled piles and the fifth drilled piles, removing concrete around the embedded steel plate, and cutting a pile top of the each of the first drilled piles, the second drilled piles, the third drilled piles, the fourth drilled piles and the fifth drilled piles into a plane;

step S4: respectively measuring a first distance between two of the first drilled piles, a second distance between two of the second drilled piles, a third distance between two of the third drilled piles and a fourth distance between two of the fifth drilled piles and recording data, cutting the at least two first I-shaped steel assemblies, the at least two second I-shaped steel assemblies, the third I-shaped steel assemblies and the fourth I-shaped steel assemblies according to the recorded data, causing the lengths of the at least two first I-shaped steel assemblies, the at least two second I-shaped steel assemblies, the third I-shaped steel assemblies and the fourth I-shaped steel assemblies to be according to the recorded data+1000 mm to ensure tension lengths of the at least two first I-shaped steel assemblies on the first drilled piles, the at least two second I-shaped steel assemblies on the second drilled piles, the third I-shaped steel assemblies on the third drilled piles, the one of the fourth I-shaped steel assemblies on the fifth drilled piles and the another one of the fourth I-shaped steel assemblies on the third drilled piles;

step S5: drawing a center line on the embedded steel plate of the each of the first drilled piles, the second drilled piles, the third drilled piles, the fourth drilled piles and the fifth drilled piles, symmetrically arranging and welding the at least two first I-shaped steel assemblies, the at least two second I-shaped steel assemblies, the third I-shaped steel assemblies and the fourth I-shaped steel assemblies respectively along the center line, and at the same time respectively welding two bars of 45a I-shaped steel of the at least two first I-shaped steel assemblies, the at least two second I-shaped steel assemblies, the third I-shaped steel assemblies and the fourth I-shaped steel assemblies into a whole;

step S6: placing two groups of the supporting Bailey support assemblies on the third drilled piles respectively, and welding each of two ends of the each of the two groups of the supporting Bailey support assemblies to a corresponding embedded steel plate of the third drilled piles;

step S7: installing and welding the second Bailey support assembly on the at least two second I-shaped steel assemblies, installing and welding a first Bailey support assembly on the at least two first I-shaped steel assemblies, installing and welding the fourth Bailey support assembly on the two groups of the supporting Bailey support assemblies, installing and welding the fifth Bailey support assembly on the fourth I-shaped steel assemblies, installing and welding two groups of the third Bailey support assembly on two groups of the third I-shaped steel assemblies respectively, welding inclined struts on two sides of the first Bailey support assembly, the second Bailey support assembly, the third Bailey support assembly, the fourth Bailey support assembly, the fifth Bailey support assembly and the two groups of the supporting Bailey support assemblies, to ensure the stability of the first Bailey support assembly, the second Bailey support assembly, the third Bailey support assembly, the fourth Bailey support assembly, the fifth Bailey support assembly and the two groups of the supporting Bailey support assemblies;

step S8: installing the first suspension device, the second suspension device, the third suspension devices, the fourth suspension device, and the fifth suspension device on the first Bailey support assembly, the second Bailey support assembly, the third Bailey support assembly, the fourth Bailey support assembly and the fifth Bailey support assembly respectively; and step S9: after the construction of a main body of an underground passage is completed, adopting a support underpinning method to underpin an underground pipeline and a heating pipeline at an underground passage top plate; after the underpinning is completed, first removing the first suspension device, the second suspension device, the third suspension devices, the fourth suspension device and the fifth suspension device and then using a tower crane to dismantle the first Bailey support assembly, the second Bailey support assembly, the third Bailey support assembly, the fourth Bailey support assembly and the fifth Bailey support assembly, then removing the at least two first I-shaped steel assemblies, the at least two second I-shaped steel assemblies, the third I-shaped steel assemblies, the fourth I-shaped steel assemblies and the two groups of the supporting Bailey support assemblies, and finally removing the first drilled piles, the second drilled piles, the third drilled piles, the fourth drilled piles and the fifth drilled piles.

11. A method for construction of the Bailey support system applied to cross protection of complex pipes and cables in an intersection tunnel according to claim 4, comprising the following steps:

step S1: according to a distribution diagram of an underground pipe network, detecting all the underground pipe network;

step S2: determining positions of the first drilled piles, the second drilled piles, the third drilled piles, the fourth drilled piles and the fifth drilled piles according to a position of the underground pipe network obtained by detection, a drilling rig entering a site to carry out construction of the first drilled piles, the second drilled piles, the third drilled piles, the fourth drilled piles and the fifth drilled piles, installing embedded steel plate in a middle position of a reinforcement cage of the each of the first drilled piles, the second drilled piles, the third drilled piles, the fourth drilled piles and the fifth drilled piles, and after the installation is in place, pouring concrete between the reinforcement cage and the embedded steel plate;

step S3: when concrete reaches a strength, removing a pile head of the each of the first drilled piles, the second drilled piles, the third drilled piles, the fourth drilled piles and the fifth drilled piles, removing concrete around the embedded steel plate, and cutting a pile top of the each of the first drilled piles, the second drilled piles, the third drilled piles, the fourth drilled piles and the fifth drilled piles into a lane;

step S4: respectively measuring a first distance between two of the first drilled piles, a second distance between two of the second drilled piles, a third distance between two of the third drilled piles and a fourth distance between two of the fifth drilled piles and recording data, cutting the at least two first I-shaped steel assemblies, the at least two second I-shaped steel assemblies, the third I-shaped steel assemblies and the fourth I-shaped steel assemblies according to the recorded data, causing the lengths of the at least two first I-shaped steel assemblies, the at least two second I-shaped steel assemblies, the third I-shaped steel assemblies and the fourth I-shaped steel assemblies to be according to the recorded data+1000 mm to ensure tension lengths of the at least two first I-shaped steel assemblies on the first drilled piles, the at least two second I-shaped steel assemblies on the second drilled piles, the third I-shaped steel assemblies on the third drilled piles, the one of the fourth I-shaped steel assemblies on the fifth drilled piles and the another one of the fourth I-shaped steel assemblies on the third drilled piles;

step S5: drawing a center line on the embedded steel plate of the each of the first drilled piles, the second drilled piles, the third drilled piles, the fourth drilled piles and the fifth drilled piles, symmetrically arranging and welding the at least two first I-shaped steel assemblies, the at least two second I-shaped steel assemblies, the third I-shaped steel assemblies and the fourth I-shaped steel assemblies respectively along the center line, and at the same time respectively welding two bars of 45a I-shaped steel of the at least two first I-shaped steel assemblies, the at least two second I-shaped steel assemblies, the third I-shaped steel assemblies and the fourth I-shaped steel assemblies into a whole;

step S6: placing two groups of supporting Bailey support assemblies which are comprised by the type IV suspension system on the third drilled piles respectively, and welding each of two ends of the each of the two groups of the supporting Bailey support assemblies to a corresponding embedded steel plate of the third drilled piles;

step S7: installing and welding the second Bailey support assembly on the at least two second I-shaped steel assemblies, installing and welding a first Bailey support assembly on the at least two first I-shaped steel assemblies, installing and welding the fourth Bailey support assembly on the two groups of the supporting Bailey support assemblies, installing and welding the fifth Bailey support assembly on the fourth I-shaped steel assemblies, installing and welding two groups of the third Bailey support assembly on two groups of the third I-shaped steel assemblies respectively, welding inclined struts on two sides of the first Bailey support assembly, the second Bailey support assembly, the third Bailey support assembly, the fourth Bailey support assembly, the fifth Bailey support assembly and the two groups of the supporting Bailey support assemblies, to ensure the stability of the first Bailey support assembly, the second Bailey support assembly, the third Bailey support assembly, the fourth Bailey support assembly, the fifth Bailey support assembly and the two groups of the supporting Bailey support assemblies;

step S8: installing the first suspension device, the second suspension device, the third suspension devices, a fourth suspension device which is comprised by the type IV suspension system, and the fifth suspension device on the first Bailey support assembly, the second Bailey support assembly, the third Bailey support assembly, the fourth Bailey support assembly and the fifth Bailey support assembly respectively; and step S9: after the construction of a main body of an underground passage is completed, adopting a support underpinning method to underpin an underground pipeline and a heating pipeline at an underground passage top plate; after the underpinning is completed, first removing the first suspension device, the second suspension device, the third suspension devices, the fourth suspension device and the fifth suspension device and then using a tower crane to dismantle the first Bailey support assembly, the second Bailey support assembly, the third Bailey support assembly, the fourth Bailey support assembly and the fifth Bailey support assembly, then removing the at least two first I-shaped steel assemblies, the at least two second I-shaped steel assemblies, the third I-shaped steel assemblies, the fourth I-shaped steel assemblies and the two groups of the supporting Bailey support assemblies, and finally removing the first drilled piles, the second drilled piles, the third drilled piles, the fourth drilled piles and the fifth drilled piles.

12. A method for construction of the Bailey support system applied to cross protection of complex pipes and cables in an intersection tunnel according to claim 5, comprising the following steps:

step S1: according to a distribution diagram of an underground pipe network, detecting all the underground pipe network;

step S2: determining positions of the first drilled piles, the second drilled piles, the third drilled piles, the fourth drilled piles and the fifth drilled piles according to a position of the underground pipe network obtained by detection, a drilling rig entering a site to carry out construction of the first drilled piles, the second drilled piles, the third drilled piles, the fourth drilled piles and the fifth drilled piles, installing embedded steel plate in a middle position of a reinforcement cage of the each of the first drilled piles, the second drilled piles, the third drilled piles, the fourth drilled piles and the fifth drilled piles, and after the installation is in place, pouring concrete between the reinforcement cage and the embedded steel plate;

step S3: when concrete reaches a strength, removing a pile head of the each of the first drilled piles, the second drilled piles, the third drilled piles, the fourth drilled piles and the fifth drilled piles, removing concrete around the embedded steel plate, and cutting a pile top of the each of the first drilled piles, the second drilled piles, the third drilled piles, the fourth drilled piles and the fifth drilled piles into a lane;

step S4: respectively measuring a first distance between two of the first drilled piles, a second distance between two of the second drilled piles, a third distance between two of the third drilled piles and a fourth distance between two of the fifth drilled piles and recording data, cutting the at least two first I-shaped steel assemblies, the at least two second I-shaped steel assemblies, the third I-shaped steel assemblies and the fourth I-shaped steel assemblies according to the recorded data, causing the lengths of the at least two first I-shaped steel assemblies, the at least two second I-shaped steel assemblies, the third I-shaped steel assemblies and the fourth I-shaped steel assemblies to be according to the recorded data+1000 mm to ensure tension lengths of the at least two first I-shaped steel assemblies on the first drilled piles, the at least two second I-shaped steel assemblies on the second drilled piles, the third I-shaped steel assemblies on the third drilled piles, the one of the fourth I-shaped steel assemblies on the fifth drilled piles and the another one of the fourth I-shaped steel assemblies on the third drilled piles;

step S5: drawing a center line on the embedded steel plate of the each of the first drilled piles, the second drilled piles, the third drilled piles, the fourth drilled piles and the fifth drilled piles, symmetrically arranging and welding the at least two first I-shaped steel assemblies, the at least two second I-shaped steel assemblies, the third I-shaped steel assemblies and the fourth I-shaped steel assemblies respectively along the center line, and at the same time respectively welding two bars of 45a I-shaped steel of the at least two first I-shaped steel assemblies, the at least two second I-shaped steel assemblies, the third I-shaped steel assemblies and the fourth I-shaped steel assemblies into a whole;

step S6: placing two groups of supporting Bailey support assemblies which are comprised by the type IV suspension system on the third drilled piles respectively, and welding each of two ends of the each of the two groups of the supporting Bailey support assemblies to a corresponding embedded steel plate of the third drilled piles;

step S7: installing and welding the second Bailey support assembly on the at least two second I-shaped steel assemblies, installing and welding a first Bailey support assembly on the at least two first I-shaped steel assemblies, installing and welding the fourth Bailey support assembly on the two groups of the supporting Bailey support assemblies, installing and welding the fifth Bailey support assembly on the fourth I-shaped steel assemblies, installing and welding two groups of the third Bailey support assembly on two groups of the third I-shaped steel assemblies respectively, welding inclined struts on two sides of the first Bailey support assembly, the second Bailey support assembly, the third Bailey support assembly, the fourth Bailey support assembly, the fifth Bailey support assembly and the two groups of the supporting Bailey support assemblies, to ensure the stability of the first Bailey support assembly, the second Bailey support assembly, the third Bailey support assembly, the fourth Bailey support assembly, the fifth Bailey support assembly and the two groups of the supporting Bailey support assemblies;

step S8: installing the first suspension device, the second suspension device, the third suspension devices, a fourth suspension device which is comprised by the type IV suspension system, and the fifth suspension device on the first Bailey support assembly, the second Bailey support assembly, the third Bailey support assembly, the fourth Bailey support assembly and the fifth Bailey support assembly respectively; and step S9: after the construction of a main body of an underground passage is completed, adopting a support underpinning method to underpin an underground pipeline and a heating pipeline at an underground passage top plate; after the underpinning is completed, first removing the first suspension device, the second suspension device, the third suspension devices, the fourth suspension device and the fifth suspension device and then using a tower crane to dismantle the first Bailey support assembly, the second Bailey support assembly, the third Bailey support assembly, the fourth Bailey support assembly and the fifth Bailey support assembly, then removing the at least two first I-shaped steel assemblies, the at least two second I-shaped steel assemblies, the third I-shaped steel assemblies, the fourth I-shaped steel assemblies and the two groups of the supporting Bailey support assemblies, and finally removing the first drilled piles, the second drilled piles, the third drilled piles, the fourth drilled piles and the fifth drilled piles.

13. A method for construction of the Bailey support system applied to cross protection of complex pipes and cables in an intersection tunnel according to claim 6, comprising the following steps:

step S1: according to a distribution diagram of an underground pipe network, detecting all the underground pipe network;

step S2: determining positions of the first drilled piles, the second drilled piles, the third drilled piles, the fourth drilled piles and the fifth drilled piles according to a position of the underground pipe network obtained by detection, a drilling rig entering a site to carry out construction of the first drilled piles, the second drilled piles, the third drilled piles, the fourth drilled piles and the fifth drilled piles, installing embedded steel plate in a middle position of a reinforcement cage of the each of the first drilled piles, the second drilled piles, the third drilled piles, the fourth drilled piles and the fifth drilled piles, and after the installation is in place, pouring concrete between the reinforcement cage and the embedded steel plate;

step S3: when concrete reaches a strength, removing a pile head of the each of the first drilled piles, the second drilled piles, the third drilled piles, the fourth drilled piles and the fifth drilled piles, removing concrete around the embedded steel plate, and cutting a pile top of the each of the first drilled piles, the second drilled piles, the third drilled piles, the fourth drilled piles and the fifth drilled piles into a plane;

step S4: respectively measuring a first distance between two of the first drilled piles, a second distance between two of the second drilled piles, a third distance between two of the third drilled piles and a fourth distance between two of the fifth drilled piles and recording data, cutting the at least two first I-shaped steel assemblies, the at least two second I-shaped steel assemblies, the third I-shaped steel assemblies and the fourth I-shaped steel assemblies according to the recorded data, causing the lengths of the at least two first I-shaped steel assemblies, the at least two second I-shaped steel assemblies, the third I-shaped steel assemblies and the fourth I-shaped steel assemblies to be according to the recorded data+1000 mm to ensure tension lengths of the at least two first I-shaped steel assemblies on the first drilled piles, the at least two second I-shaped steel assemblies on the second drilled piles, the third I-shaped steel assemblies on the third drilled piles, the one of the fourth I-shaped steel assemblies on the fifth drilled piles and the another one of the fourth I-shaped steel assemblies on the third drilled piles;

step S5: drawing a center line on the embedded steel plate of the each of the first drilled piles, the second drilled piles, the third drilled piles, the fourth drilled piles and the fifth drilled piles, symmetrically arranging and welding the at least two first I-shaped steel assemblies, the at least two second I-shaped steel assemblies, the third I-shaped steel assemblies and the fourth I-shaped steel assemblies respectively along the center line, and at the same time respectively welding two bars of 45a I-shaped steel of the at least two first I-shaped steel assemblies, the at least two second I-shaped steel assemblies, the third I-shaped steel assemblies and the fourth I-shaped steel assemblies into a whole;

step S6: placing two groups of supporting Bailey support assemblies which are comprised by the type IV suspension system on the third drilled piles respectively, and welding each of two ends of the each of the two groups of the supporting Bailey support assemblies to a corresponding embedded steel plate of the third drilled piles;

step S7: installing and welding the second Bailey support assembly on the at least two second I-shaped steel assemblies, installing and welding a first Bailey support assembly on the at least two first I-shaped steel assemblies, installing and welding the fourth Bailey support assembly on the two groups of the supporting Bailey support assemblies, installing and welding the fifth Bailey support assembly on the fourth I-shaped steel assemblies, installing and welding two groups of the third Bailey support assembly on two groups of the third I-shaped steel assemblies respectively, welding inclined struts on two sides of the first Bailey support assembly, the second Bailey support assembly, the third Bailey support assembly, the fourth Bailey support assembly, the fifth Bailey support assembly and the two groups of the supporting Bailey support assemblies, to ensure the stability of the first Bailey support assembly, the second Bailey support assembly, the third Bailey support assembly, the fourth Bailey support assembly, the fifth Bailey support assembly and the two groups of the supporting Bailey support assemblies;

step S8: installing the first suspension device, the second suspension device, the third suspension devices, a fourth suspension device which is comprised by the type IV suspension system, and the fifth suspension device on the first Bailey support assembly, the second Bailey support assembly, the third Bailey support assembly, the fourth Bailey support assembly and the fifth Bailey support assembly respectively; and step S9: after the construction of a main body of an underground passage is completed, adopting a support underpinning method to underpin an underground pipeline and a heating pipeline at an underground passage top plate; after the underpinning is completed, first removing the first suspension device, the second suspension device, the third suspension devices, the fourth suspension device and the fifth suspension device and then using a tower crane to dismantle the first Bailey support assembly, the second Bailey support assembly, the third Bailey support assembly, the fourth Bailey support assembly and the fifth Bailey support assembly, then removing the at least two first I-shaped steel assemblies, the at least two second I-shaped steel assemblies, the third I-shaped steel assemblies, the fourth I-shaped steel assemblies and the two groups of the supporting Bailey support assemblies, and finally removing the first drilled piles, the second drilled piles, the third drilled piles, the fourth drilled piles and the fifth drilled piles.

14. A method for construction of the Bailey support system applied to cross protection of complex pipes and cables in an intersection tunnel according to claim 7, comprising the following steps:

step S1: according to a distribution diagram of an underground pipe network, detecting all the underground pipe network;

step S2: determining positions of the first drilled piles, the second drilled piles, the third drilled piles, the fourth drilled piles and the fifth drilled piles according to a position of the underground pipe network obtained by detection, a drilling rig entering a site to carry out construction of the first drilled piles, the second drilled piles, the third drilled piles, the fourth drilled piles and the fifth drilled piles, installing embedded steel plate in a middle position of a reinforcement cage of the each of the first drilled piles, the second drilled piles, the third drilled piles, the fourth drilled piles and the fifth drilled piles, and after the installation is in place, pouring concrete between the reinforcement cage and the embedded steel plate;

step S3: when concrete reaches a strength, removing a pile head of the each of the first drilled piles, the second drilled piles, the third drilled piles, the fourth drilled piles and the fifth drilled piles, removing concrete around the embedded steel plate, and cutting a pile top of the each of the first drilled piles, the second drilled piles, the third drilled piles, the fourth drilled piles and the fifth drilled piles into a lane;

step S4: respectively measuring a first distance between two of the first drilled piles, a second distance between two of the second drilled piles, a third distance between two of the third drilled piles and a fourth distance between two of the fifth drilled piles and recording data, cutting the at least two first I-shaped steel assemblies, the at least two second I-shaped steel assemblies, the third I-shaped steel assemblies and the fourth I-shaped steel assemblies according to the recorded data, causing the lengths of the at least two first I-shaped steel assemblies, the at least two second I-shaped steel assemblies, the third I-shaped steel assemblies and the fourth I-shaped steel assemblies to be according to the recorded data+1000 mm to ensure tension lengths of the at least two first I-shaped steel assemblies on the first drilled piles, the at least two second I-shaped steel assemblies on the second drilled piles, the third I-shaped steel assemblies on the third drilled piles, the one of the fourth I-shaped steel assemblies on the fifth drilled piles and the another one of the fourth I-shaped steel assemblies on the third drilled piles;

step S5: drawing a center line on the embedded steel plate of the each of the first drilled piles, the second drilled piles, the third drilled piles, the fourth drilled piles and the fifth drilled piles, symmetrically arranging and welding the at least two first I-shaped steel assemblies, the at least two second I-shaped steel assemblies, the third I-shaped steel assemblies and the fourth I-shaped steel assemblies respectively along the center line, and at the same time respectively welding two bars of 45a I-shaped steel of the at least two first I-shaped steel assemblies, the at least two second I-shaped steel assemblies, the third I-shaped steel assemblies and the fourth I-shaped steel assemblies into a whole;

step S6: placing two groups of supporting Bailey support assemblies which are comprised by the type IV suspension system on the third drilled piles respectively, and welding each of two ends of the each of the two groups of the supporting Bailey support assemblies to a corresponding embedded steel plate of the third drilled piles;

step S7: installing and welding the second Bailey support assembly on the at least two second I-shaped steel assemblies, installing and welding a first Bailey support assembly on the at least two first I-shaped steel assemblies, installing and welding the fourth Bailey support assembly on the two groups of the supporting Bailey support assemblies, installing and welding the fifth Bailey support assembly on the fourth I-shaped steel assemblies, installing and welding two groups of the third Bailey support assembly on two groups of the third I-shaped steel assemblies respectively, welding inclined struts on two sides of the first Bailey support assembly, the second Bailey support assembly, the third Bailey support assembly, the fourth Bailey support assembly, the fifth Bailey support assembly and the two groups of the supporting Bailey support assemblies, to ensure the stability of the first Bailey support assembly, the second Bailey support assembly, the third Bailey support assembly, the fourth Bailey support assembly, the fifth Bailey support assembly and the two groups of the supporting Bailey support assemblies;

step S8: installing the first suspension device, the second suspension device, the third suspension devices, a fourth suspension device which is comprised by the type IV suspension system, and the fifth suspension device on the first Bailey support assembly, the second Bailey support assembly, the third Bailey support assembly, the fourth Bailey support assembly and the fifth Bailey support assembly respectively; and step S9: after the construction of a main body of an underground passage is completed, adopting a support underpinning method to underpin an underground pipeline and a heating pipeline at an underground passage top plate; after the underpinning is completed, first removing the first suspension device, the second suspension device, the third suspension devices, the fourth suspension device and the fifth suspension device and then using a tower crane to dismantle the first Bailey support assembly, the second Bailey support assembly, the third Bailey support assembly, the fourth Bailey support assembly and the fifth Bailey support assembly, then removing the at least two first I-shaped steel assemblies, the at least two second I-shaped steel assemblies, the third I-shaped steel assemblies, the fourth I-shaped steel assemblies and the two groups of the supporting Bailey support assemblies, and finally removing the first drilled piles, the second drilled piles, the third drilled piles, the fourth drilled piles and the fifth drilled piles.

* * * * *